(12) United States Patent
Mori et al.

(10) Patent No.: US 7,587,267 B2
(45) Date of Patent: Sep. 8, 2009

(54) VEHICLE SPEED CONTROL APPARATUS

(75) Inventors: Yukio Mori, Kariya (JP); Koichi Kokubo, Kariya (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 532 days.

(21) Appl. No.: 11/399,522

(22) Filed: Apr. 7, 2006

(65) Prior Publication Data

US 2006/0241844 A1    Oct. 26, 2006

(30) Foreign Application Priority Data

Apr. 21, 2005    (JP)    ............................. 2005-123177

(51) Int. Cl.
*F16H 59/66* (2006.01)
*G06F 19/00* (2006.01)
(52) U.S. Cl. .............................. 701/93; 701/90; 701/94
(58) Field of Classification Search .................. 701/93, 701/94, 95, 70, 75, 79
See application file for complete search history.

(56) References Cited

U.S. PATENT DOCUMENTS

| | | | |
|---|---|---|---|
| 6,098,005 A * | 8/2000 | Tsukamoto et al. | 701/65 |
| 6,404,072 B2 * | 6/2002 | Onoyama et al. | 290/40 C |
| 7,065,442 B2 * | 6/2006 | Sakata | 701/72 |
| 2001/0018384 A1 * | 8/2001 | Onimaru et al. | 477/118 |
| 2005/0216164 A1 * | 9/2005 | Sakata | 701/70 |

FOREIGN PATENT DOCUMENTS

| | | | |
|---|---|---|---|
| JP | 2002-019486 A | 1/2002 |
| JP | 2002-089314 A | 3/2002 |
| JP | 2003-127705 A | 5/2003 |
| JP | 2003-252188 A | 9/2003 |
| JP | 2004-169674 A | 6/2004 |

OTHER PUBLICATIONS

Chinese Office Action (with English language translation) dated Sep. 28, 2007.

* cited by examiner

*Primary Examiner*—Tan Q Nguyen
(74) *Attorney, Agent, or Firm*—Buchanan Ingersoll & Rooney PC

(57) ABSTRACT

This apparatus determines that a driver demands the maintenance of a vehicle body speed from a cancel operation (ON→OFF) of an acceleration requiring operation by an accelerator pedal or a cancel operation (ON→OFF) of a deceleration requiring operation by a brake pedal BP, so that it detects a "body-speed-maintenance requiring operation" (at time t1), and stores the vehicle body speed Vso at the point of the detection as a "required maintenance vehicle speed Vref". When the apparatus determines that the vehicle is on a downhill after the detection of the "body-speed-maintenance requiring operation" (time t2), it feedback-controls the brake hydraulic pressure Pw to thereby start and execute the automatic control (downhill speed control) of the vehicle body speed Vso such that the vehicle body speed Vso is maintained at the required maintenance vehicle speed Vref.

14 Claims, 10 Drawing Sheets

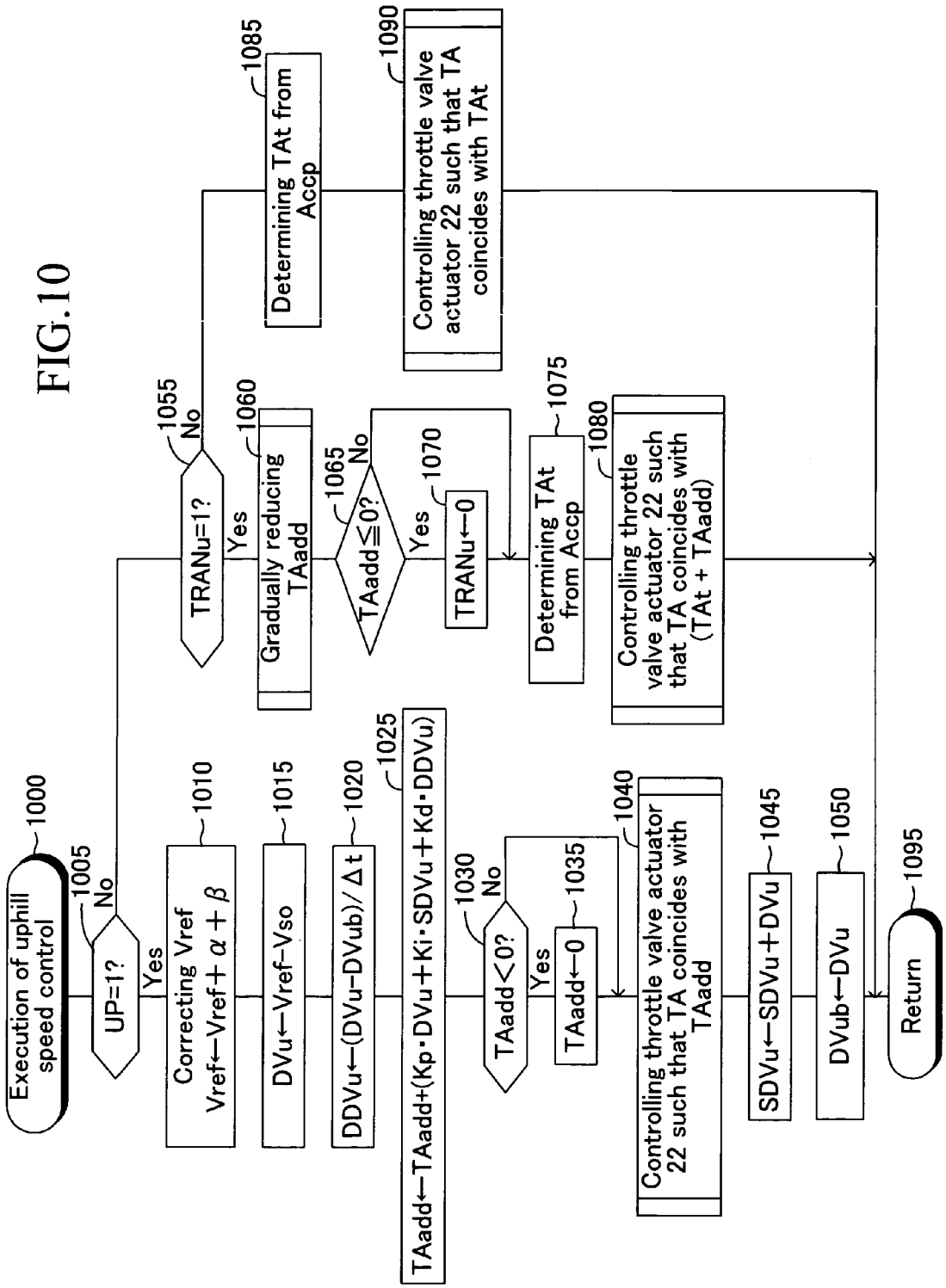

VEHICLE SPEED CONTROL APPARATUS

BACKGROUND OF THE INVENTION

1. Field of the Invention

The present invention relates to a vehicle speed control apparatus that automatically controls a body speed of a vehicle.

2. Description of the Related Art

Conventionally, there has widely been known this type of vehicle speed control apparatus. For example, the following patent reference 1 discloses a running control apparatus that detects a body-speed-maintenance requiring operation by a driver by the operation (ON-operation) of an automatic running switch by the driver, and performs an automatic control so as to maintain the vehicle body speed at a target vehicle speed.

[Patent Reference 1]
Japanese Patent Application Laid-Open No. 2002-089314

In the apparatus disclosed in the above-mentioned reference, the driver has to operate the automatic running switch in order to start the automatic control of a vehicle body speed. In other words, in case where the driver requires the start of the automatic control of the vehicle body speed (i.e., in case where the body-speed-maintenance requiring operation is performed), the driver is required to operate the components other than the "components for changing the vehicle speed", such as an accelerator pedal, brake pedal, or the like. As a result, there arises a problem of the operation by a driver being complicated.

SUMMARY OF THE INVENTION

The present invention is accomplished in order to cope with the above-mentioned requirement, and aims to provide a vehicle speed control apparatus that automatically controls a vehicle body speed, capable of simplifying the operation by a driver necessary for the start of the automatic control of a vehicle body speed.

A vehicle speed control apparatus according to the present invention has vehicle-speed-maintenance requiring operation detecting means, storing means, and vehicle speed automatic control means. The operations of these means will be explained hereinafter one by one.

Firstly, the vehicle-speed-maintenance requiring operation detecting means detects a body-speed-maintenance requiring operation by a driver based upon the operation by the driver on the operation member for changing the vehicle speed that is operated for changing the vehicle body speed. Here, the "operation member for changing the vehicle speed" generally includes an accelerator pedal, brake pedal, or the like. Further, in a vehicle having a configuration in which a joy stick is operated for changing (accelerating or decelerating) the vehicle body speed, the joy stick corresponds to the "operation member for changing the vehicle speed".

The vehicle-speed-maintenance requiring operation detecting means detects the body-speed-maintenance requiring operation by a driver based upon the operation by the driver on the "operation member for changing the vehicle speed". Therefore, the driver demands the start of the automatic control for the vehicle body speed without operating the members other than the "operation member for changing the vehicle speed" such as an accelerator pedal, brake pedal, or the like.

The storing means stores, as a required maintenance vehicle speed, the vehicle body speed at the point when the body-speed-maintenance requiring operation is detected by the vehicle-speed-maintenance requiring operation detecting means. Accordingly, the vehicle body speed at the point when the driver demands the start of the automatic control for the vehicle body speed is stored as the required maintenance vehicle speed.

The vehicle speed automatic control means automatically controls the vehicle body speed so as to be maintained at the required maintenance vehicle speed, in case where the body-speed-maintenance requiring operation is detected by the vehicle-speed-maintenance requiring operation detecting means. The vehicle speed automatic control means controls the braking force by the control of the brake hydraulic pressure or the like, and/or the driving force by the control of the throttle valve opening or the like, independent of the operation on the "operation member for changing the vehicle speed" such as an accelerator pedal, brake pedal, or the like by a driver, in order to maintain the vehicle body speed at the required maintenance vehicle speed.

From the above, a driver can demand the start of the automatic control for a vehicle body speed without operating "the member other than the operation member for changing the vehicle speed", such as the aforesaid automatic running switch or the like. Accordingly, the invention can facilitate the operation by a driver necessary for the start of the automatic control for the vehicle body speed.

The vehicle body speed at the point when the body-speed-maintenance requiring operation is detected is stored as the required maintenance vehicle speed, and the vehicle body speed is automatically controlled so as to be maintained at the required maintenance vehicle speed. Therefore, the driver operates the "operation member for changing the vehicle speed" such as an accelerator pedal, brake pedal, or the like to adjust the vehicle body speed to a desired speed, and executes the operation, corresponding to the aforesaid "body-speed-maintenance requiring operation", to the "operation member for changing the vehicle speed" that is currently operated at the point when the vehicle body speed is adjusted to the desired speed, thereby being capable of maintaining the vehicle body speed at the desired speed.

It should be noted that the vehicle speed automatic control means may start the automatic control for the vehicle body speed immediately after the aforesaid "body-speed-maintenance requiring operation" is detected, or may start the automatic control after the detection of the "body-speed-maintenance requiring operation" and after the establishment of a predetermined condition.

In this case, the vehicle-speed-maintenance requiring operation detecting means is preferably configured to detect the body-speed-maintenance requiring operation by the driver according to the cancel of the acceleration requiring operation by the driver to the accelerating operation member that serves as the operation member for changing the vehicle speed and is operated for accelerating the vehicle. The accelerating operation member includes, for example, an accelerator pedal, above-mentioned joy stick, or the like.

In case where a driver cancels (releases) the operation on the accelerating operation member such as an accelerator pedal, or the like, from the state in which he/she operates the accelerating operation member, he/she generally desires in most cases that the vehicle body speed is kept to be the value at the point when the operation on the accelerating operation member is canceled. Therefore, the presence of the body-speed-maintenance requirement by a driver can easily and surely be detected by using the cancel operation on the accelerating requirement by the driver on the accelerating operation member as the "body-speed-maintenance requiring operation".

The vehicle-speed-maintenance requiring operation detecting means is preferably configured to detect the body-speed-maintenance requiring operation by the driver according to the cancel of the deceleration requiring operation by the driver to the decelerating operation member that serves as the operation member for changing the vehicle speed and is operated for decelerating the vehicle. The decelerating operation member includes, for example, a brake pedal, above-mentioned joy stick, or the like.

In case where a driver cancels (releases) the operation on the decelerating operation member such as a brake pedal, or the like, from the state in which he/she operates the decelerating operation member, he/she generally desires in most cases that the vehicle body speed is kept to be the value at the point when the operation on the decelerating operation member is canceled, like the above-mentioned case of the cancel operation on the accelerating operation member. Therefore, the presence of the body-speed-maintenance requirement by a driver can also easily and surely be detected by using the cancel operation on the decelerating requirement by the driver on the decelerating operation member as the "body-speed-maintenance requiring operation".

Further, the invention may be configured such that the "body-speed-maintenance requiring operation" is detected by the change of the operation states of the accelerating operation member and the decelerating operation member such as the change from the state in which at least one of the accelerating operation member and the decelerating operation member is operated to the state in which both the accelerating operation member and the decelerating operation member are not operated.

It is preferable that the speed control apparatus according to the present invention further has downhill determining means for determining whether the vehicle is on a downhill or not, and the vehicle speed automatic control means automatically controls the vehicle body speed in case where the body-speed-maintenance requiring operation is detected by the vehicle-speed-maintenance requiring operation detecting means and the downhill determining means determines that the vehicle is on a downhill.

In case where a vehicle is on a downhill, a driver generally has to continuously operate the decelerating operation member so as to keep the vehicle body speed constant. In other words, in case where a vehicle is on a downhill, a degree of a demand for the automatic control that keeps the vehicle body speed constant is extremely high. Specifically, according to the above-mentioned configuration, the automatic control can surely be executed in case where a vehicle is on a downhill and the degree of the demand for the automatic control is extremely high.

In this case, the downhill determining means is preferably configured to detect that the vehicle is on a downhill when the driver does not operate the operation member for changing the vehicle speed and when the value obtained by subtracting the required maintenance vehicle speed from the vehicle body speed is greater than a predetermined value.

In case where a vehicle is running on a downhill (going down), force in the accelerating direction caused by the gravity on the vehicle is exerted on the vehicle. Therefore, the vehicle is gradually accelerated in the state in which both the accelerating operation member and the decelerating operation member are not operated (i.e., in the state in which the operation member for changing the vehicle speed is not operated).

Accordingly, when a driver executes the "body-speed-maintenance requiring operation" in case where the vehicle is running on a downhill, the vehicle body speed gradually increases from the required maintenance vehicle speed after that (and before the start of the automatic control). Specifically, the aforesaid configuration makes it possible to determine whether the vehicle is on a downhill or not without using a sensor that physically detects an inclination of a road surface, such as an inclination sensor or the like.

It is preferable that the speed control apparatus according to the present invention further has uphill determining means for determining whether the vehicle is on an uphill or not, and the vehicle speed automatic control means automatically controls the vehicle body speed in case where the body-speed-maintenance requiring operation is detected by the vehicle-speed-maintenance requiring operation detecting means and the uphill determining means determines that the vehicle is on an uphill.

In case where a vehicle is on an uphill, a driver generally has to continuously operate the accelerating operation member so as to keep the vehicle body speed constant, like the case of the downhill. In other words, in case where a vehicle is on an uphill, a degree of a demand for the automatic control that keeps the vehicle body speed constant is extremely high. Specifically, according to the above-mentioned configuration, the automatic control can surely be executed in case where a vehicle is on an uphill and the degree of the demand for the automatic control is extremely high.

In this case, the uphill determining means is preferably configured to detect that the vehicle is on an uphill when the driver does not operate the operation member for changing the vehicle speed and when the value obtained by subtracting the vehicle body speed from the required maintenance vehicle speed is greater than a predetermined value.

In case where a vehicle is running on an uphill (going up), force in the decelerating direction caused by the gravity on the vehicle is exerted on the vehicle. Therefore, the vehicle is gradually decelerated in the state in which both the accelerating operation member and the decelerating operation member are not operated (i.e., in the state in which the operation member for changing the vehicle speed is not operated).

Accordingly, when a driver executes the "body-speed-maintenance requiring operation" in case where the vehicle is running on an uphill, the vehicle body speed gradually decreases from the required maintenance vehicle speed after that (and before the start of the automatic control). Specifically, the aforesaid configuration makes it possible to determine whether the vehicle is on an uphill or not without using a sensor that physically detects an inclination of a road surface, such as an inclination sensor or the like.

It is preferable that the speed control apparatus according to the present invention further has turning state obtaining means for obtaining the turning state of the vehicle and required-maintenance-vehicle-speed changing means for changing the required maintenance vehicle speed in accordance with the obtained turning state of the vehicle.

Here, the turning state obtaining means obtains the turning state of the vehicle based upon the information relating to a degree of a curve (e.g., radius or the like) of a road obtained through a vehicle roadside communication, the information relating to a degree of a curve (e.g., radius or the like) of a road obtained through GPS, an angle of a steering operated by a driver, or the like.

Supposing that the vehicle starts turning, such as the case where the vehicle is coming in a corner, in case where the automatic control is executed during the run on a downhill and the vehicle body speed is kept constant at the required maintenance vehicle speed. In this case, centrifugal force is exerted on the vehicle, so that the vehicle is liable to be unstable. Therefore, it is considered that decreasing the required maintenance vehicle speed is preferable for securing the stability of the vehicle, in case where the degree of the turning is great (specifically, the turning radius is small) and great centrifugal force is exerted on the vehicle.

From the above, the configuration in which the required maintenance vehicle speed is changed in accordance with the turning state of the vehicle makes it possible to decrease the required maintenance vehicle speed than the value at the present point if the turning radius becomes not more than the predetermined value. As a result, in case where the vehicle is coming in a corner during the automatic control (or before the automatic control), the stability of the vehicle is easy to be secured after that.

It is preferable that the speed control apparatus according to the present invention further has inclination degree obtaining means for obtaining the degree of inclination of a road surface on which the vehicle is running, and required-maintenance-vehicle-speed changing means for changing the required maintenance vehicle speed in accordance with the obtained degree of inclination of the road surface.

Here, the inclination degree obtaining means obtains the degree of inclination of a road surface based upon the information relating to a degree of inclination (grade) of a road obtained through a vehicle roadside communication, the information relating to a degree of inclination of a road obtained through GPS, a difference between a vehicle body longitudinal acceleration obtained from a longitudinal acceleration sensor of a vehicle body and a vehicle body longitudinal acceleration obtained from a wheel speed, or the like.

Supposing that the degree of inclination of the road surface becomes excessively great in case where the automatic control is executed during the run on a downhill and the vehicle body speed is kept constant at the required maintenance vehicle speed. In this case, it is considered that decreasing the required maintenance vehicle speed is preferable for securing the stability of the vehicle.

From the above, the configuration in which the required maintenance vehicle speed is changed in accordance with the degree of inclination of a road surface makes it possible to decrease the required maintenance vehicle speed than the value at the present point if the degree of inclination of the road surface becomes not more than the predetermined value. As a result, in case where the degree of inclination of the road surface becomes excessively great during the automatic control (or before the automatic control), the stability of the vehicle is easy to be secured after that.

It is preferable that the speed control apparatus according to the present invention further has road state determining means for determining whether the road surface on which the vehicle is running is in a specific state or not, and the vehicle speed automatic control means automatically controls the vehicle body speed when the body-speed-maintenance requiring operation is detected by the vehicle-speed-maintenance requiring operation detecting means and the road state determining means determines that the road surface on which the vehicle is running is in the specific state.

Here, the specific state includes, for example, a predetermined low-$\mu$ road, predetermined rough road, or the like. The road state determining means determines whether the road surface is in the specific state or not based upon the state of the road obtained through a vehicle roadside communication, output from an ambient temperature sensor, or the like.

In case where the vehicle is running on a low-$\mu$ road such as an icy road or on a rough road having great irregularity, a degree of a demand for the automatic control that keeps the vehicle body speed constant tends to be high. Specifically, according to the above-mentioned configuration, the automatic control can surely be executed in case where the road surface on which the vehicle is running is in the specific state such as a low-$\mu$ road or rough road and the degree of the demand for the automatic control is extremely high.

In addition, in the speed control apparatus according to the present invention, the vehicle speed automatic control means is preferably configured to end the automatic control of the vehicle body speed when the operation by the driver on the operation member for changing the vehicle speed is detected during the execution of the automatic control of the vehicle body speed.

With this configuration, when the driver operates the "operation member for changing the vehicle speed" such as an accelerator pedal, brake pedal, or the like during the execution of the automatic control, the automatic control is ended. As a result, the driver can readjust the vehicle body speed to a new desired speed by continuously operating, after that, the "operation member for changing the vehicle speed", that is currently operated.

The driver again executes the operation, corresponding to the "body-speed-maintenance requiring operation", on the "operation member for changing the vehicle speed" that is currently operated at the point when the vehicle body speed is adjusted to the new desired speed, thereby being capable of maintaining the vehicle body speed at the new desired speed.

In other words, the driver can freely set/change the vehicle body speed kept during the automatic control (i.e., the above-mentioned required maintenance vehicle speed) to a desired value only by operating the "operation member for changing the vehicle speed" such as an accelerator pedal, brake pedal, or the like.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which:

FIG. 5 is a flowchart showing a routine executed by the CPU shown in FIG. 1 for calculating wheel speeds or the like;

FIG. 10 is a flowchart showing a routine executed by the CPU in the speed control apparatus according to the second embodiment for executing the uphill speed control.

DESCRIPTION OF THE PREFERRED EMBODIMENT

Figure 1:
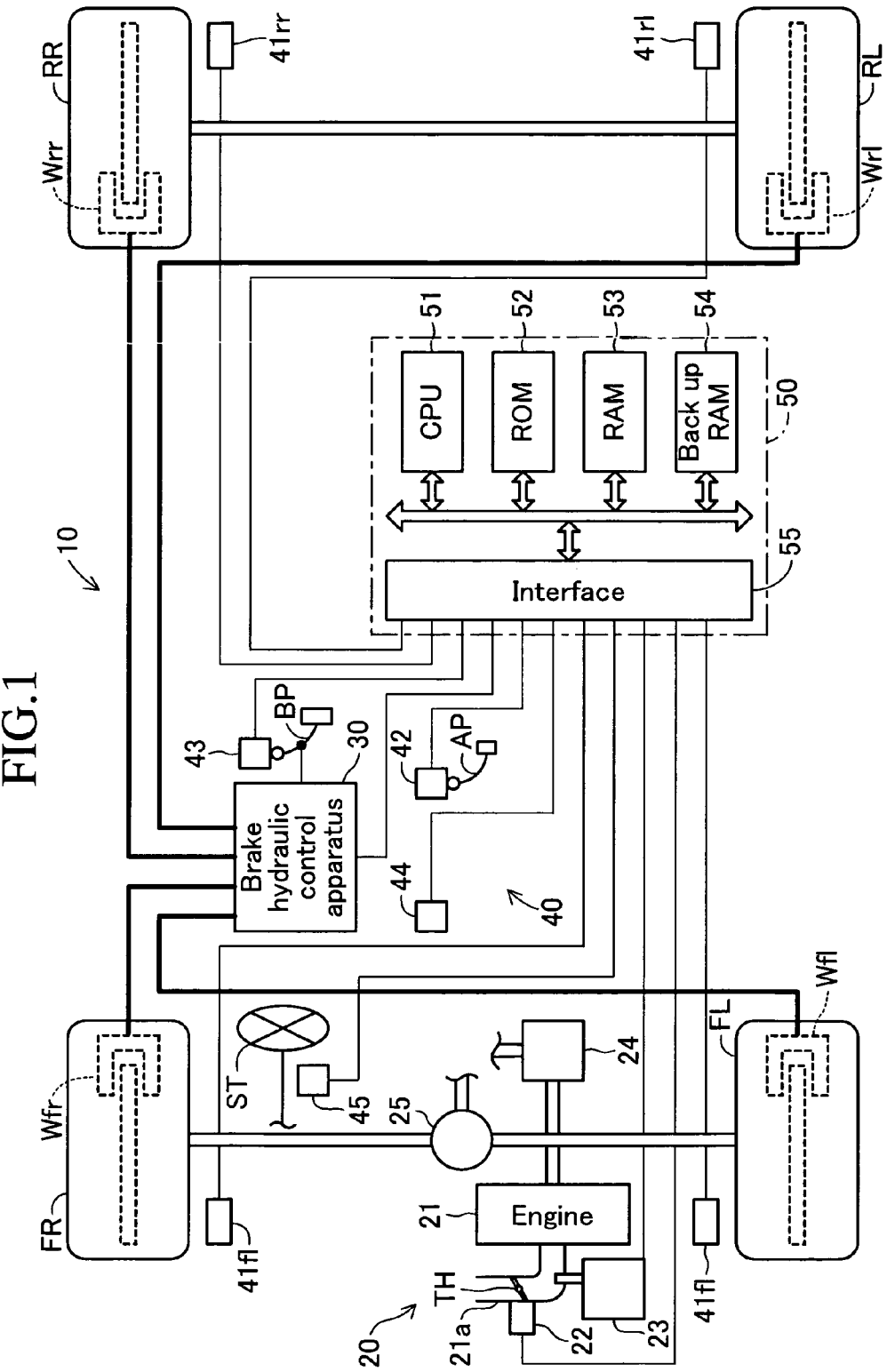
FIG. 1 is a schematic structural diagram of a vehicle equipped with a vehicle speed control apparatus according to a first embodiment of the present invention.

Below, each embodiment of a vehicle speed control apparatus according to the present invention will be described while referring to the drawings.

First Embodiment

FIG. 1 schematically illustrates a vehicle on which a speed control apparatus 10 according to the first embodiment of the present invention is mounted. The illustrated vehicle is a front-wheel-drive vehicle whose two front wheels are driven wheels.

The speed control apparatus 10 has a drive force transmission mechanism section 20 which generates a drive force and transmits it to drive wheels FL, FR, RL, and RR; a brake hydraulic pressure control apparatus 30 for generating a braking force in each wheel by brake hydraulic pressure; a sensor section 40 comprising various sensors; and an electronic control apparatus 50.

The drive force transmission mechanism section 20 comprises an engine 21 which generates a drive force; a throttle valve actuator 22 comprising a DC motor which controls the opening (throttle valve opening TA) of a throttle valve TH which is disposed in an intake pipe 21a of the engine 21 and which varies the open cross-sectional area of the intake passage; a fuel injection apparatus 23 which includes fuel infectors which spray fuel in the vicinity of unillustrated intake ports of the engine 21.

The drive force transmission mechanism section 20 also comprises a transmission 24 whose input shaft is connected to the output shaft of the engine 21; and a front-wheel-side differential 25 which is connected to the output shaft of the transmission 24 and properly distributes and transmits the drive force from the engine 21 to the front wheels FL and FR.

Figure 2:
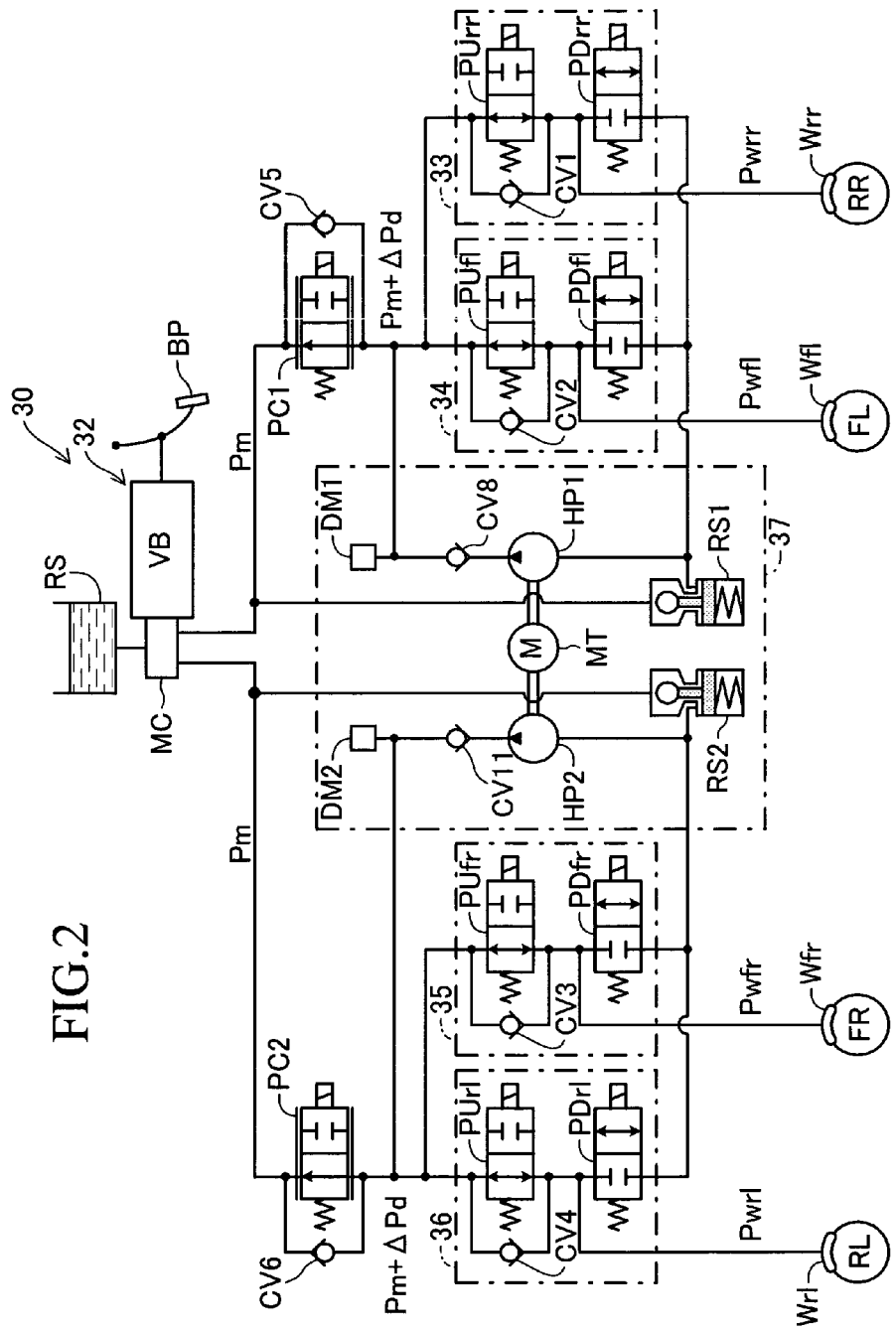
FIG. 2 is a schematic structural diagram of the brake hydraulic pressure control apparatus shown in FIG. 1.

As schematically shown in FIG. 2, the brake hydraulic pressure control apparatus 30 includes brake hydraulic pressure generating section 32 which generates brake hydraulic pressure corresponding to the operating force of a brake pedal BP; RR brake hydraulic pressure adjusting section 33, FL brake hydraulic pressure adjusting section 34, FR brake hydraulic pressure adjusting section 35 and RL brake hydraulic pressure adjusting section 36, each of which can adjust the brake hydraulic pressure supplied to each of wheel cylinders Wrr, Wfl, Wfr and Wrl arranged at each wheel RR, FL, FR and RL, and a return brake fluid supplying section 45.

The brake hydraulic pressure generating section 32 includes a vacuum booster VB which operates in response to operation of the brake pedal BP, and a master cylinder MC which is linked to the vacuum booster VB. The vacuum booster VB utilizes the pressure (negative pressure) of air within the intake pipe of the engine 21 so as to boost the operating force of the brake pedal BP by a prescribed ratio and transmits the boosted operating force to the master cylinder MC.

The master cylinder MC has two output ports; i.e., a first port and a second port. The master cylinder MC receives brake fluid from a reservoir RS, and generates from the first port a first master cylinder hydraulic pressure Pm corresponding to the boosted operating force. The master cylinder MC also generates from the second port a second master cylinder hydraulic pressure Pm which is substantially the same as the first master cylinder hydraulic pressure and which corresponds to the boosted operating force.

The structures and operations of the master cylinder MC and the vacuum booster VB are well known, and therefore an explanation of the details thereof will be omitted. In this manner, the master cylinder MC and the vacuum booster VB (brake hydraulic generating means) generate first and second master cylinder hydraulic pressures corresponding to the operating force of the brake pedal BP.

A normally-open linear solenoid valve PC1 is interposed between the first port of the master cylinder MC and the upstream side of the RR brake hydraulic pressure adjusting section 33 and the upstream side of the FL brake hydraulic pressure adjusting section 34. Similarly, a normally-open linear solenoid valve PC2 is interposed between the second port of the master cylinder MC and the upstream side of the FR brake hydraulic pressure adjusting section 35 and the upstream side of the RL brake hydraulic pressure adjusting section 36. The details of the normally-open linear solenoid valves PC1 and PC2 will be described later.

The RR brake hydraulic pressure adjusting section 33 consists of a pressure-increasing valve PUrr, which is a normally-open solenoid valve of a 2-port, 2-position type, and a pressure-reducing valve PDrr, which is a normally-closed solenoid valve of a 2-port, 2-position type. The pressure-increasing valve PUrr establishes and brakes communication between the upstream side of the RR brake hydraulic pressure adjusting section 33 and the wheel cylinder Wrr, which will be described later. The pressure-reducing valve PDrr establishes and brakes communication between the wheel cylinder Wrr and a reservoir RS1. Therefore, through control of the pressure-increasing valve PUrr and the pressure-reducing valve PDrr, the brake hydraulic pressure within the wheel cylinder Wrr (wheel cylinder pressure Pwrr) can be increased, maintained, and reduced.

In addition, a check valve CV1 which allows flow of the brake fluid in only one direction from the wheel cylinder Wrr side to the upstream side of the RR brake hydraulic pressure adjusting section 33 is connected in parallel with the pressure-increasing valve PUrr. As a result, when the brake pedal BP is released after being operated, the wheel cylinder pressure Pwrr is rapidly decreased.

Similarly, the FL brake hydraulic pressure adjusting section 34, the FR brake hydraulic pressure adjusting section 35, and the RL brake hydraulic pressure adjusting section 36 comprise a pressure-increasing valve PUfl and a pressure-reducing valve PDfl, a pressure-increasing valve PUfr and a pressure-reducing valve PDfr, and a pressure-increasing valve PUrl and a pressure-reducing valve PDrl, respectively. Through control of each pressure-increasing valve and pressure-reducing valve, the brake hydraulic pressure in the wheel cylinder Wfl, the wheel cylinder Wfr, and the wheel cylinder Wrl (wheel cylinder pressures Pwfl, Pwfr, Pwrl) can be increased, maintained, or decreased. Check valves CV2, CV3, and CV4 are provided in parallel with the pressure-increasing valves PUfl, PUfr, and PUrl, respectively, to provide the same function as that of the check valve CV1.

The return brake fluid supply section 37 includes a DC motor MT, and two hydraulic pumps (gear pumps) HP1 and HP2 simultaneously driven by the motor MT. The hydraulic pump HP1 pumps the brake fluid returned from the pressure reducing valves PDrr and PDfl to the reservoir RS1, and supplies the pumped brake fluid to the upstream sides of the RR brake hydraulic pressure adjusting section 33 and the FL brake hydraulic pressure adjusting section 34 via a check valve CV8.

Similarly, the hydraulic pump HP2 pumps the brake fluid returned from the pressure reducing valves PDfr and PDrl to the reservoir RS2, and supplies the pumped brake fluid to the upstream sides of the FR brake hydraulic pressure adjusting section 35 and the RL brake hydraulic pressure adjusting section 36 via a check valve CV11. Notably, in order to reduce pulsations of discharge pressures of the hydraulic pumps HP1 and HP2, a damper DM1 is disposed in a hydraulic circuit between the check valve CV8 and the normally-open linear solenoid valve PC1, and a damper DM2 is disposed in a hydraulic circuit between the check valve CV11 and the normally-open linear solenoid valve PC2.

Next, the normally-open linear solenoid valve PC1 will be described. The valve body of the normally-open linear solenoid valve PC1 always receives force in the opening direction stemming from urging force of an unillustrated coil spring, and also receives force in the opening direction stemming from the differential pressure obtained through subtraction of the first master cylinder pressure Pm from the pressure at the upstream side of the RR brake hydraulic pressure adjusting section 33 and the upstream side of the FL brake hydraulic pressure adjusting section 34 (hereinafter simply referred to as "actual differential pressure") and force in the closing directions stemming from attraction force which increases in proportion to current supplied to the normally-open linear solenoid valve PC1 (i.e., instruction current Id).

Figure 3:
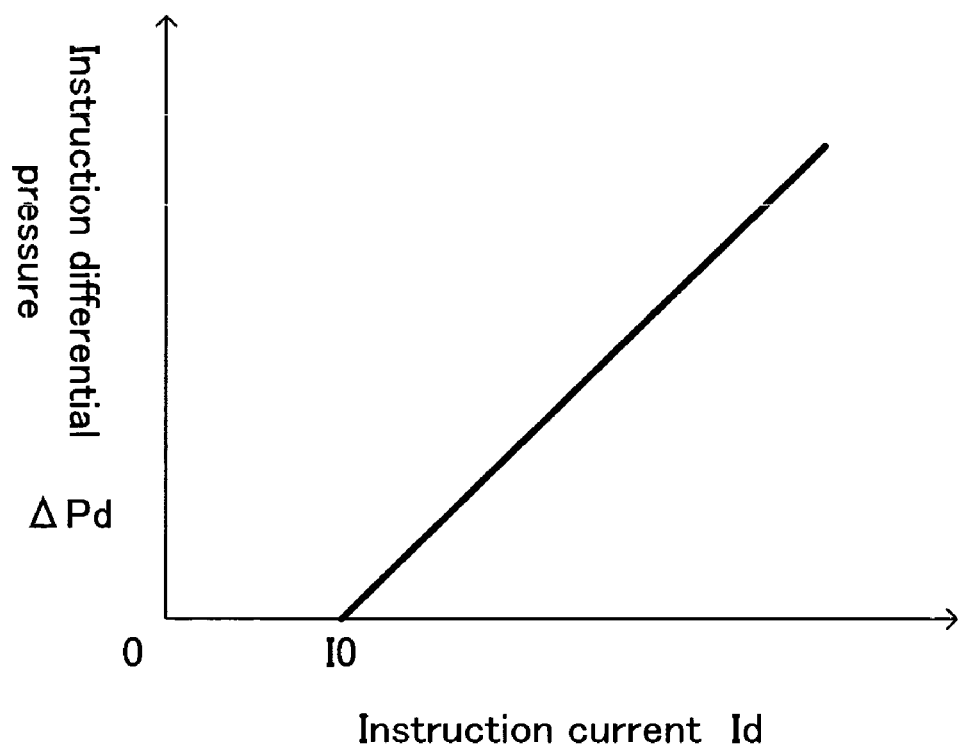
FIG. 3 is a graph showing the relation between an instruction current and an instruction differential pressure regarding the normally-open linear solenoid valve shown in FIG. 2.

As a result, as shown in FIG. 3, instruction differential pressure $\Delta Pd$ corresponding to the attraction force is determined such that it increases in proportion to the instruction current Id. In FIG. 3, 10 represents a current value corresponding to the urging force of the coil spring. When the instruction differential pressure $\Delta Pd$ is greater than the above-described actual differential pressure, the normally-open linear solenoid valve PC1 closes so as to brake the communication between the first port of the master cylinder MC, and the upstream portion of the RR brake hydraulic pressure adjusting section 33 and the upstream portion of the FL brake hydraulic pressure adjusting section 34. Meanwhile, when the instruction differential pressure $\Delta Pd$ is less than the actual differential pressure, the normally-open linear solenoid valve PC1 opens so as to establish the communication between the first port of the master cylinder MC, and the upstream portion of the RR brake hydraulic pressure adjusting section 33 and the upstream portion of the FL brake hydraulic pressure adjusting section 34.

As a result, the brake fluid at the upstream portion of the RR brake hydraulic pressure adjusting section 33 and the upstream portion of the FL brake hydraulic pressure adjusting section 34 (supplied from the hydraulic pump HP1) flows toward the first port of the master cylinder MC via the normally-open linear solenoid valve PC1, whereby the actual differential pressure is adjusted to coincide with the instruction differential pressure $\Delta Pd$. Notably, the brake fluid flowing into the first port of the master cylinder MC is returned to the reservoir RS1.

In other words, when the motor MT (accordingly, the hydraulic pumps HP1 and HP2) is driven, the actual differential pressure (its allowable maximum value) can be controlled in accordance with the instruction current Id of the normally-open linear solenoid valve PC1. At that time, the pressure on the upstream side of the RR brake hydraulic pressure adjusting section 33 and the FL brake hydraulic pressure adjusting section 34 becomes equal to the sum (Pm+$\Delta Pd$) of the first master cylinder pressure Pm and the actual differential pressure (i.e., the instruction differential pressure $\Delta Pd$).

Meanwhile, when the normally-open linear solenoid valve PC1 is brought into an unexcited state (i.e., when the instruction current Id is set to zero), the normally-open linear solenoid valve PC1 maintains its open state because of urging force of the coil spring. At this time, the actual differential pressure becomes zero, and the pressure on the upstream side of the RR brake hydraulic pressure adjusting section 33 and the upstream side of the FL brake hydraulic pressure adjusting section 34 becomes equal to the first master cylinder pressure Pm.

The normally-open linear solenoid valve PC2 is the same as the normally-open linear solenoid valve PC1 in terms of structure and operation. Accordingly, when the motor MT (accordingly, the hydraulic pumps HP1 and HP2) is driven, the pressure on the upstream side of the FR brake hydraulic pressure adjusting section 35 and the upstream side of the RL brake hydraulic pressure adjusting section 36 becomes equal to the sum (Pm+$\Delta Pd$) of the second master cylinder pressure Pm and the instruction differential pressure $\Delta Pd$. Meanwhile, when the normally-open linear solenoid valve PC2 is brought into an unexcited state, the pressure on the upstream side of the FR brake hydraulic pressure adjusting section 35 and the upstream side of the RL brake hydraulic pressure adjusting section 36 becomes equal to the second master cylinder pressure Pm.

In addition, a check valve CV5 which allows flow of the brake fluid in only one direction from the first port of the master cylinder MC to the upstream portion of the RR brake hydraulic pressure adjusting section 33 and the upstream portion of the FL brake hydraulic pressure adjusting section 34 is connected in parallel with the normally-open linear solenoid valve PC1. By virtue of this configuration, even during a period in which the actual differential pressure is controlled in accordance with the instruction current Id supplied to the normally-open linear solenoid valve PC1, when, upon operation of the brake pedal BP, the first master cylinder pressure Pm becomes higher than the pressure on the upstream side of the RR brake hydraulic pressure adjusting section 33 and the upstream side of the FL brake hydraulic pressure adjusting section 34, brake hydraulic pressure (i.e., the first master cylinder pressure Pm) corresponding to the operation force of the brake pedal BP can be supplied to the wheel cylinders Wrr and Wfl. Further, a check valve CV6, which provides the same function as does the check valve CV 5, is connected in parallel with the normally-open linear solenoid valve PC2.

As is apparent from the above description, the brake hydraulic control apparatus 30 is composed of two hydraulic circuit systems; i.e., a hydraulic circuit system regarding the rear right wheel RR and the front left wheel FL and a hydraulic circuit system regarding the rear left wheel RL and the front right wheel FR. The brake hydraulic control apparatus 30 is configured such that when all the solenoid valves are in their unexcited states, brake hydraulic pressure (i.e., master cylinder pressure Pm) corresponding to the operation force of the brake pedal BP is supplied to the wheel cylinder W**\*\***.

Notably, the symbol "**\*\*" appended to various variables and the like collectively represents the symbols fl, fr, rl and rr and indicates that the particular variable or the like applies to all of the wheels FR, FL, etc. of the vehicle. For example, the wheel cylinder W\*\*** collectively indicates the wheel cylinder Wfl for the front left wheel, the wheel cylinder Wfr for the front right wheel, the wheel cylinder Wrl for the rear left wheel, and the wheel cylinder Wrr for the rear right wheel.

Meanwhile, the brake hydraulic control apparatus 30 is configured such that when the motor MT (accordingly, the hydraulic pumps HP1 and HP2) is driven and the normally-open linear solenoid valves PC1 and PC2 are excited by an instruction current Id in this state, brake hydraulic pressure which is higher than the master cylinder pressure Pm by an instruction differential pressure ΔPd determined in accordance with the instruction current Id can be supplied to the wheel cylinder W**.

In addition, the brake hydraulic control apparatus 30 is configured such that the wheel cylinder pressure PW can be individually adjusted through control of the pressure-increasing valve PU and the pressure-reducing valve PD**. That is, the brake hydraulic control apparatus 30 is configured to individually adjust the brake forces applied to the respective wheels independently of operation of the brake pedal BP by the driver. Thus, the brake hydraulic control apparatus 30 can achieve downhill speed control, which will be described later, in accordance with an instruction from the electronic control apparatus 50 described later.

Referring back to FIG. 1, the sensor section 40 includes electromagnetic-pickup-type wheel speed sensor 41*fl*, 41*fr*, 41*rl*, and 41*rr* which respectively output signals having frequencies corresponding to the respective rotational speeds of the wheels FL, FR, RL, and RR; an accelerator opening sensor 42 which detects an operated amount of an accelerator pedal AP operated by a driver and outputs a signal indicative of the operation amount (accelerator operation amount Accp) of the accelerator pedal AP; a brake switch 43 which detects whether a brake pedal BP is operated or not and outputs ON/OFF signal in accordance with the operation or non-operation of the brake pedal BP; a longitudinal accelerator sensor 44 which detects a vehicle acceleration in the front-to-rear direction of the vehicle and outputs a signal indicative of a vehicle acceleration detecting value Gx; and a steering angle sensor 45 which detects a rotational angle of a steering wheel ST from its neutral position and outputs a signal indicative of the steering angle θs.

The steering angle θs is zero when the steering wheel ST is located at the neutral position. The steering angle θs assumes a positive value when the steering wheel ST is turned counterclockwise (as viewed from a driver side), and assumes a negative value when the steering wheel ST is turned clockwise. The vehicle acceleration detecting value Gx assumes a positive value when the (advancing) vehicle is in the accelerating state, and assumes a negative value when the (advancing) vehicle is in the decelerating state.

The electronic control apparatus 50 is a microcomputer which includes a CPU 51; ROM 52 in which are previously stored routines (programs) to be executed by the CPU 51, tables (look-up tables and maps), constants, and the like; RAM 53 in which the CPU 51 temporarily stores data as necessary; backup RAM 54 which stores data when the power supply is on and which maintains the stored data when the power supply is cut off; an interface 55 containing A/D converters; and the like. The above components are interconnected via a bus. The interface 55 is connected to the aforesaid sensors 41 to 46. The interface supplies signals from the sensors, etc. 41 to 46 to the CPU 51. Further, in accordance with instructions from the CPU 51, the interface 55 outputs drive signals to the respective solenoid valves and the motor MT of the hydraulic pressure control apparatus 30, the throttle valve actuator 22, and the fuel injection apparatus 23.

By virtue of the above-described configuration, the throttle valve actuator 22 drives the throttle valve TH such that the opening TA of the throttle valve TH basically coincides with a target throttle valve opening TAt, which is determined based upon a predetermined map or the like, corresponding to the operation amount Accp of the accelerator pedal AP; and the fuel injection apparatus 23 injects fuel of a quantity which is required to obtain a predetermined target air-fuel ratio (theoretical air-fuel ratio) for cylinder-interior intake air quantity, which is the quantity of air taken into each cylinder.

Outline of Downhill Speed Control

Next, there will be described an outline of a downhill speed control which is performed by the speed control apparatus 10 (hereinafter may be referred to as "the present apparatus") according to the first embodiment of the present invention having the above-mentioned configuration. In case where a vehicle is on a downhill and a driver intends to keep the vehicle body speed constant at a desired speed, it is necessary to continuously operate the brake pedal BP. In other words, a degree of a demand for an automatic control for keeping a vehicle body speed constant is extremely high in case where a vehicle is on a downhill.

On the other hand, in general (in case where a vehicle is on a downhill, in particular), in case where a driver cancels an acceleration requiring operation given by the accelerator pedal AP (specifically, in case where the operation amount Accp of the accelerator pedal AP is changed to "0" from a value greater than "0"), he/she frequently desires to keep the vehicle body speed at the value upon the cancel of the acceleration requiring operation by the accelerator pedal AP. For the sake of convenience of explanation, the state in which the operation amount Accp of the accelerator pedal is greater than "0" is referred to as "the accelerator pedal AP is ON", and the state in which the operation amount Accp of the accelerator pedal is "0" is referred to as "the accelerator pedal AP is OFF" hereinafter.

Similarly (in case where a vehicle is on a downhill, in particular), in case where a driver cancels a deceleration requiring operation given by the brake pedal BP (specifically, in case where the output signal from the brake switch 43 is changed to OFF from ON), he/she frequently desires to keep the vehicle body speed at the value upon the cancel of the deceleration requiring operation by the brake pedal BP. For the sake of convenience of explanation, the state in which the output signal from the brake switch 43 is ON is referred to as "the brake pedal BP is ON", and the state in which the output signal from the brake switch 43 is OFF is referred to as "the brake pedal BP is OFF" hereinafter.

From the above, when the operation states of the accelerator pedal AP and the brake pedal BP are changed such that the state in which at least one of the accelerator pedal AP and the brake pedal BP is turned ON is changed to the state in which both the accelerator pedal AP and the brake pedal BP are turned OFF, the present apparatus determines that a driver requires the maintenance of the vehicle body speed, whereby it detects a "body-speed-maintenance requiring operation".

At the same time, the present apparatus stores the vehicle body speed at this point, i.e., at the time when the "body-speed-maintenance requiring operation" is detected, as a "required maintenance vehicle speed Vref". As described above, the present apparatus detects the "body-speed-maintenance requiring operation" based upon the operation of an operation member for changing a vehicle speed by a driver.

In addition to this, the present apparatus determines whether the vehicle is on a downhill or not after the "body-speed-maintenance requiring operation" is detected. When it determines that the vehicle is on a downhill, it feedback-controls the brake hydraulic pressure (wheel cylinder hydraulic pressure Pw**) so as to keep the vehicle body speed at the required maintenance vehicle speed Vref, thereby automatically controlling the vehicle body speed. The specific control method of the brake hydraulic pressure will be described later.

Here, "whether the vehicle is on a downhill or not" can be determined by, for example, utilizing an accelerating action exerted on a vehicle on a downhill due to gravity. Specifically, a vehicle on a downhill can gradually be accelerated due to an accelerating action by gravity in a state after the "body-speed-maintenance requiring operation" is detected (i.e., in a state in which both the accelerator pedal AP and the brake pedal BP are turned OFF).

Accordingly, the condition (hereinafter referred to as "downhill speed control starting condition") is established in which "both the accelerator pedal AP and the brake pedal BP are turned OFF and "the value obtained by subtracting the required maintenance vehicle speed Vref from the vehicle body speed Vso is greater than a predetermined value A (positive constant value)" after the "body-speed-maintenance requiring operation" is detected, it can be determined that "the vehicle is on a downhill".

From the above, when the above-mentioned "downhill speed control starting condition" is established after the "body-speed-maintenance requiring operation" is detected, the present apparatus controls the brake hydraulic pressure, regardless of the brake pedal operation by a driver, thereby performing an automatic control for keeping the vehicle body speed Vso at the required maintenance vehicle speed Vref. This automatic control is referred to as "downhill speed control" hereinafter.

Figure 4:
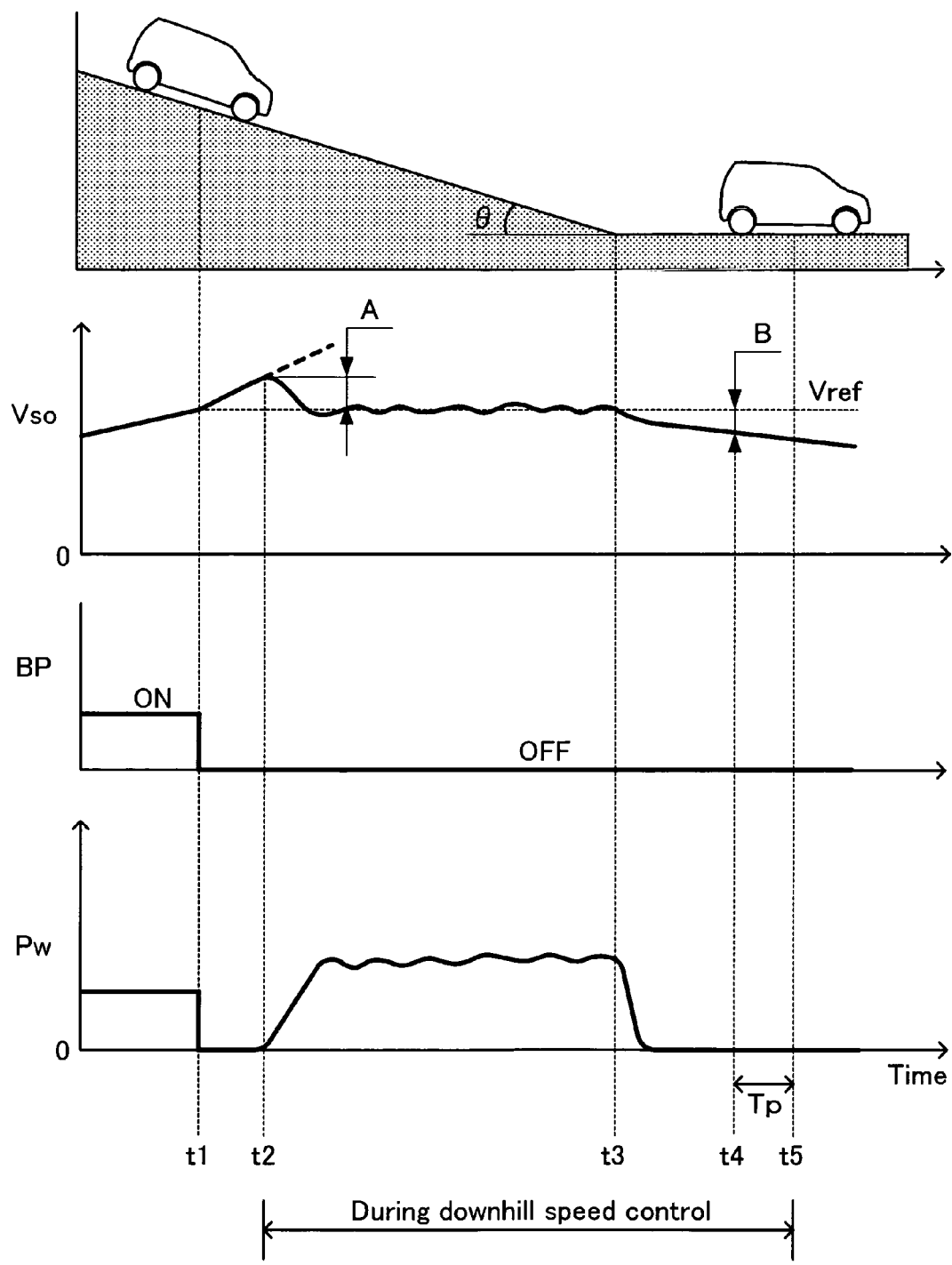
FIG. 4 is a time chart showing one example of a change in a vehicle body speed, a state of a brake pedal, and a wheel cylinder hydraulic pressure in case where a downhill speed control is executed to a vehicle running on a downhill.

FIG. 4 is a time chart showing one example of a change in the vehicle body speed Vso, the state of the brake pedal BP and the wheel cylinder hydraulic pressure Pw (Pw**) in case where the downhill speed control is executed by the present apparatus to a vehicle that is running on a downhill. It should be noted that, in FIG. 4, the accelerator pedal AP is kept to be OFF. Further, it is supposed that the downhill speed control is not executed before a time t1.

As shown in FIG. 4, a driver operates (turns ON) the brake pedal BP so as to adjust the vehicle body speed Vso to a desired speed before the time t1. As a result, the wheel cylinder hydraulic pressure Pw is adjusted to a value corresponding to the operating force of the brake pedal BP, so that braking force in accordance with the operating force of the brake pedal BP is given to the vehicle.

When the time t1 has arrived, the adjustment of the vehicle body speed Vso to the desired speed is completed, so that the driver releases the operated brake pedal BP (i.e., the ON-state of the brake pedal BP is changed to OFF-state). With this operation, at the time t1, the present apparatus detects the "body-speed-maintenance requiring operation" and sets the required maintenance vehicle speed Vref to the vehicle body speed Vso at this point.

After the time t1, the brake pedal BP (and the accelerator pedal AP) is in OFF state (accordingly, the wheel cylinder hydraulic pressure Pw is "0"), and the vehicle body speed Vso gradually increases by the accelerating action due to gravity. By virtue of this, the value obtained by subtracting the required maintenance vehicle speed Vref from the vehicle body speed Vso exceeds the predetermined value A at a time t2.

As a result, the aforesaid "downhill speed control starting condition" is established at the time t2, so that the present apparatus starts the "downhill speed control" at the time t2. Specifically, after the time t2, the present apparatus feedback-controls the brake hydraulic pressure (i.e., wheel cylinder hydraulic pressure Pw) so as to keep the vehicle body speed Vso at the required maintenance vehicle speed Vref by controlling the brake hydraulic control apparatus 30, regardless of the brake pedal BP being kept to be turned OFF, until a "downhill speed control ending condition" described later is established.

Consequently, the vehicle body speed Vso that becomes greater than the required maintenance vehicle speed Vref is immediately made decelerated around the required maintenance vehicle speed Vref after the time t2, and after that, kept to be near the required maintenance vehicle speed Vref. On the other hand, in case where the "downhill speed control" is not executed at the time t2, the vehicle body speed Vso still keeps gradually increasing even after the time t2 as shown by a broken line in FIG. 4.

When a time t3 has arrived, the vehicle is supposed to move from the downhill to a flat (horizontal) road. Accordingly, the downhill speed control should be ended. Therefore, it is necessary to determine whether "the vehicle moves to a flat road or not". Here, "whether the vehicle moves to a flat road or not" can be determined as follows, for example.

Since the accelerating action by gravity is not exerted on the vehicle after the time t3, the vehicle body speed Vso starts to decelerate (starts variance) from the required maintenance vehicle speed Vref due to the braking force by the wheel cylinder hydraulic pressure Pw (>0) generated at the time t3 by the downhill speed control.

As a result, the present apparatus tries to still keep the vehicle body speed Vso at the required maintenance vehicle speed Vref by the downhill speed control, now being executed, after the time t3, whereby it immediately decreases/maintains the wheel cylinder hydraulic pressure Pw to "0". However, both the brake pedal BP and the accelerator pedal AP are kept to be OFF-state after the time t3. Therefore, even if the wheel cylinder hydraulic pressure Pw is kept to be "0" after the time t3, the vehicle body speed Vso still keeps decreasing due to resistance based upon air resistance involved with the run (so-called running resistance), engine brake, or the like.

Therefore, when a time t4 has arrived, the value obtained by subtracting the vehicle body speed Vso from the required maintenance vehicle speed Vref exceeds a predetermined value B (positive constant value), and after that, the vehicle body speed Vso keeps decreasing. From the above, when the condition (hereinafter referred to as "downhill speed control ending condition") is established in which the state where "the wheel cylinder hydraulic pressure Pw (actually, a target wheel cylinder hydraulic pressure Pwt described later) is "0"" and "the value obtained by subtracting the vehicle body speed Vso from the required maintenance vehicle speed Vref exceeds the predetermined value B" continues for a predetermined short period Tp (see a time t5), it can be determined that "the vehicle moves to a flat road".

From the above, the present apparatus determines that the "downhill speed control ending condition" is established at the time t5 at which the "downhill speed control ending condition" is established, so that it ends the "downhill speed control" at the time t5. With this operation, the wheel cylinder hydraulic pressure Pw is adjusted to the value corresponding to the operating force of the brake pedal BP after the time t5 (until the aforesaid "downhill speed control starting condition" is again established), like the case before the time t1.

In addition, in case where the accelerator pedal AP or the brake pedal BP is operated (turned ON) by a driver during when the "downhill speed control" is being executed (from the time t2 to the time t5 in FIG. 4), the present apparatus immediately ends the "downhill speed control". Accordingly, the driver can readjust the vehicle body speed Vso to a new desired speed by continuously operating the accelerator pedal AP or the brake pedal BP, that is currently operated, after that.

Then, the driver again executes the operation (i.e., the aforesaid "body-speed-maintenance requiring operation") for releasing the currently operating accelerator pedal AP or brake pedal BP at the point when the vehicle body speed Vso is adjusted to the new desired speed, whereby the "downhill speed control" for keeping the vehicle body speed Vso at the new desired speed can be started again.

As described above, the driver can freely set/change the vehicle body speed Vso (i.e., required maintenance vehicle speed Vref) that is kept during the downhill speed control to a desired value only by operating the accelerator pedal AP or the brake pedal BP.

When the wheel cylinder hydraulic pressure Pw (>0) generated at the ending point of the "downhill speed control" is changed to a value corresponding to the operating force of the brake pedal BP after that in case where the "downhill speed control" is ended by the operation of the accelerator pedal AP or the brake pedal BP as described above, shock accompanied by the rapid change (decrease) in the braking force by the brake hydraulic pressure is likely to be produced on the vehicle, which may bring uncomfortable feeling to a driver. Accordingly, in this case, the present apparatus executes a later-described "downhill—flat-road transfer control" so as to make the wheel cylinder hydraulic pressure Pw gradually close to the value corresponding to the operating force of the brake pedal BP. The above is the outline of the "downhill speed control"

Actual Operation

Next, the actual operation of the speed control apparatus 10 thus configured according to the first embodiment of the present invention will be explained with reference to FIGS. 5 to 7, which show routines executed by the CPU 51 of the electronic control apparatus 50 in the form of flowcharts.

Figure 5:
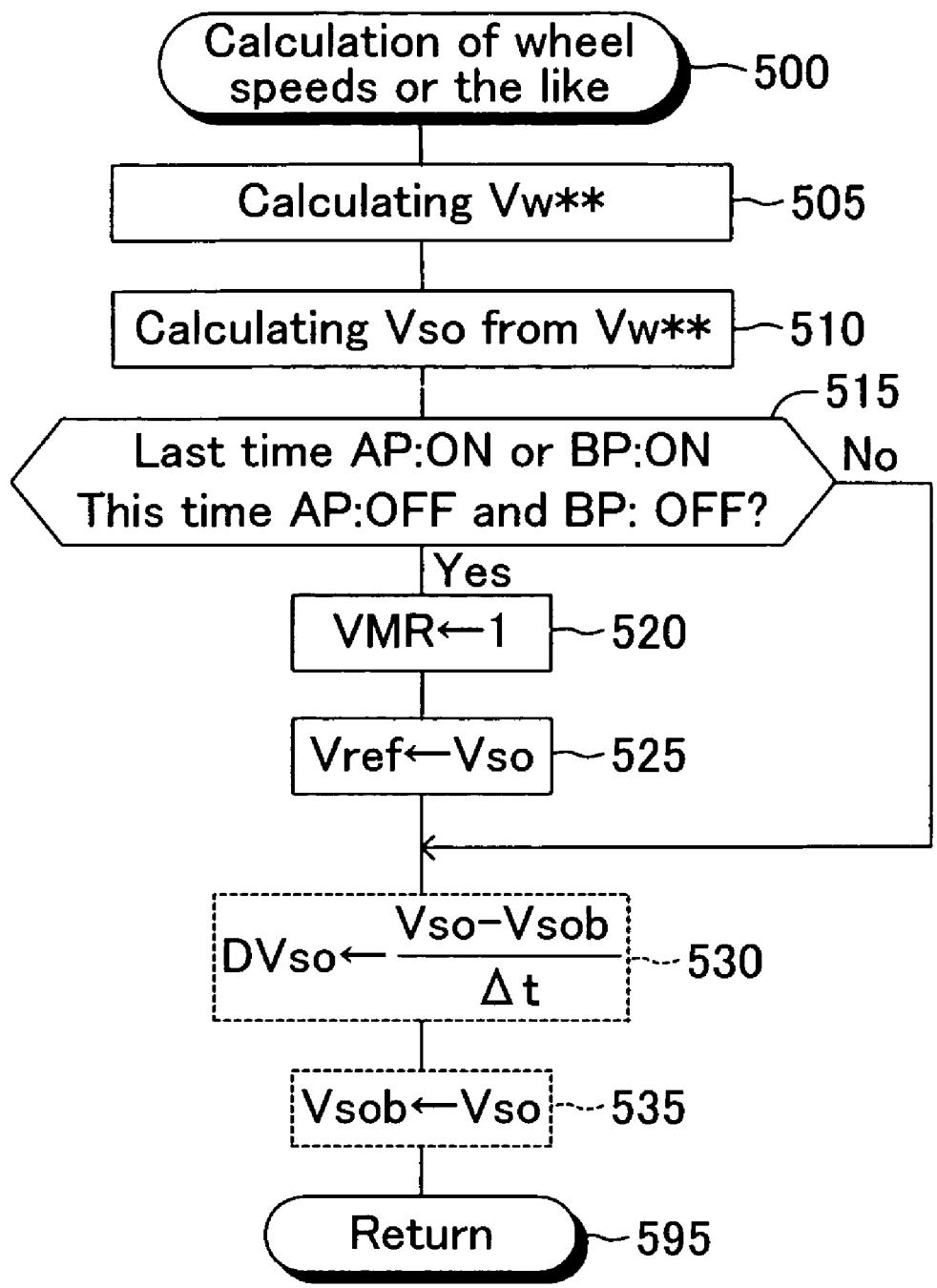

The CPU 51 repeatedly executes a routine shown in FIG. 5 for calculation of wheel speeds, etc. every time a predetermined time (execution interval Δt: e.g., 6 msec) elapses. Accordingly, when a predetermined timing has come, the CPU 51 initiates the processing from step 500 and proceeds to step 505 so as to respectively calculate present wheel speeds (outer circumferential speeds) Vw of the wheels . Specifically, the CPU 51 respectively calculates the wheel speeds Vw on the basis of the fluctuation frequencies of the output values of the wheel speed sensors 41.

Then, the CPU 51 proceeds to step 510 for estimating the vehicle body speed Vso from the wheel speeds Vw. The vehicle body speed Vso is set, for example, to the smallest value of the wheel speeds Vw during the acceleration (the accelerator pedal AP is ON), while set to the greatest value of the wheel speeds Vw** during the deceleration (the brake pedal BP is ON).

Subsequently, the CPU 51 proceeds to step 515 so as to determine whether the operating states of the accelerator pedal AP and the brake pedal BP are changed from "the state in which at least one of them is ON" to "the state in which both are OFF" (i.e., determine whether the "body-speed-maintenance requiring operation" is done or not). When the CPU 51 makes a "No" determination, it proceeds directly to step 595 so as to end the current execution of the present routine. It should be noted that steps 530 and 535 shown by a broken line are those executed only in a second embodiment described later.

On the other hand, when the CPU 51 makes a "Yes" determination at step 515 (when the "body-speed-maintenance requiring operation" is detected), it proceeds to step 520 to set the value of a flag VMR to "1", and set at the next step 525 the required maintenance vehicle speed Vref to the current vehicle body speed Vso that is required at the above-mentioned step 510. Thereafter, the CPU 51 proceeds to step 595 so as to end the current execution of the present routine. The step 515 corresponds to body-speed-maintenance requiring operation detecting means, and the step 525 corresponds to storing means.

The flag VMR indicates that the "body-speed-maintenance requiring operation" is detected when the value thereof is "1" and that the "body-speed-maintenance requiring operation" is not detected when the value thereof is "0".

After that, the CPU 51 updates the respective values by repeatedly executing the present routine at the execution time intervals Δt. Accordingly, every time the "body-speed-maintenance requiring operation" is detected, the required maintenance vehicle speed Vref is updated. Since both the accelerator pedal AP and the brake pedal BP are kept to be OFF during the execution of the "downhill speed control" as described above, the "body-speed-maintenance requiring operation" cannot be detected, with the result that the required maintenance vehicle speed Vref is not updated.

Figure 6:
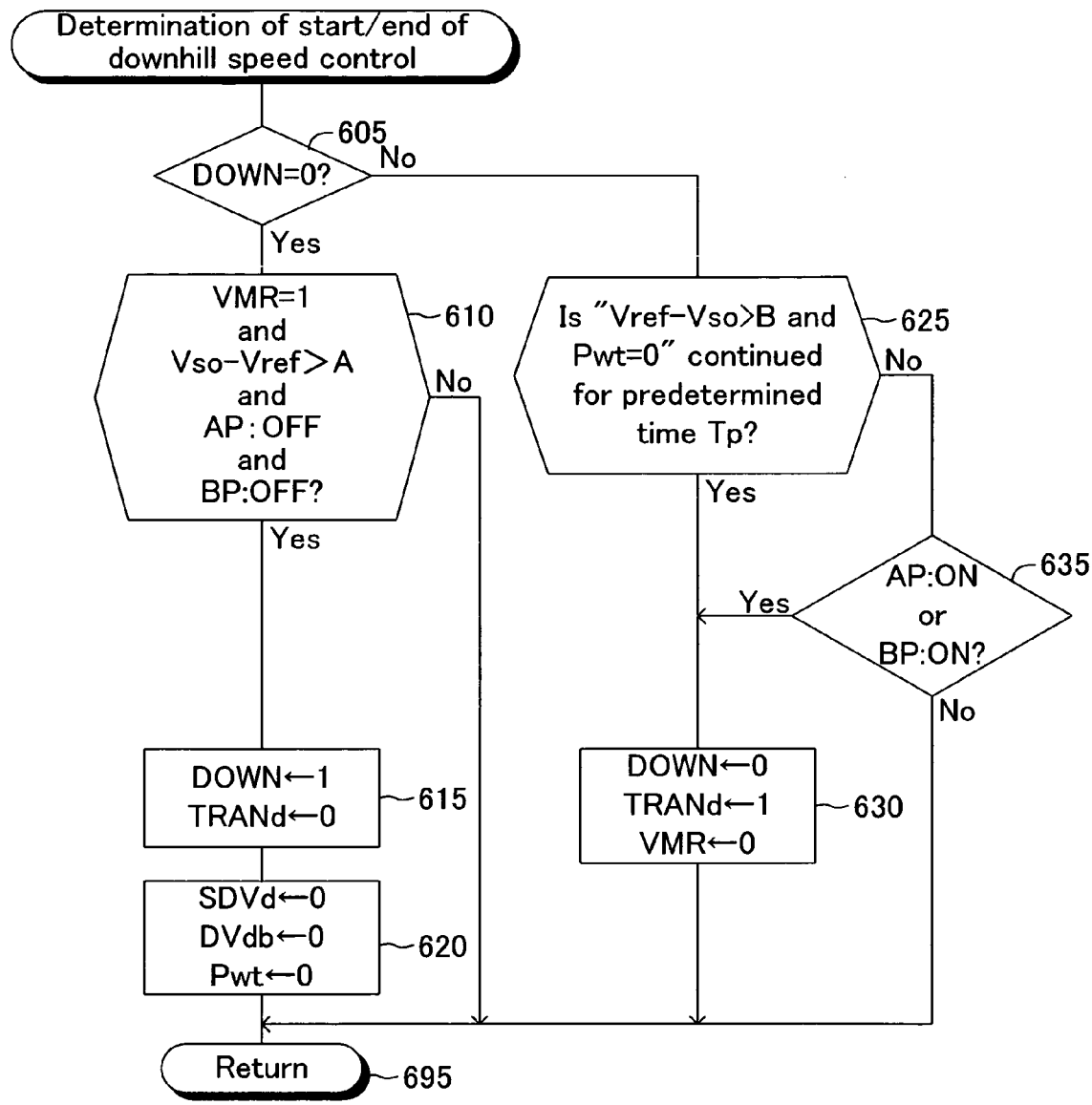
FIG. 6 is a flowchart showing a routine executed by the CPU shown in FIG. 1 for determining the start/end of the downhill speed control.

The CPU 51 repeatedly executes a routine shown in FIG. 6 for determining the start/end of the "downhill speed control" shown in FIG. 6 every time a predetermined time (execution interval Δt: e.g., 6 msec) elapses. Accordingly, when a predetermined timing has come, the CPU 51 initiates the processing from step 600 and proceeds to step 605 so as to determine whether the value of a flag DOWN is "0" or not. The flag DOWN indicates that the "downhill speed control is being executed when the value thereof is "1" and that the "downhill speed control is not being executed when the value thereof is "0".

Here, the explanation is continued supposing that the "downhill speed control" is not being executed (DOWN=0) and the above-mentioned "downhill speed control starting condition" is not established. In this case, the CPU 51 makes a "Yes" determination at step 605, and proceeds to step 610 so as to determine whether the above-mentioned "downhill speed control starting condition" is established or not. The CPU 51 makes a "No" determination here, and then, proceeds directly to step 695 so as to end the current execution of the present routine. The step 610 corresponds to downhill determining means.

After that, the CPU 51 repeatedly executes the processes at steps 605 and 610 so long as the "downhill speed control starting condition" is not established. With these processes, the value of the flag DOWN is kept to be "0" (see the period before the time t2 in FIG. 4).

Figure 7:
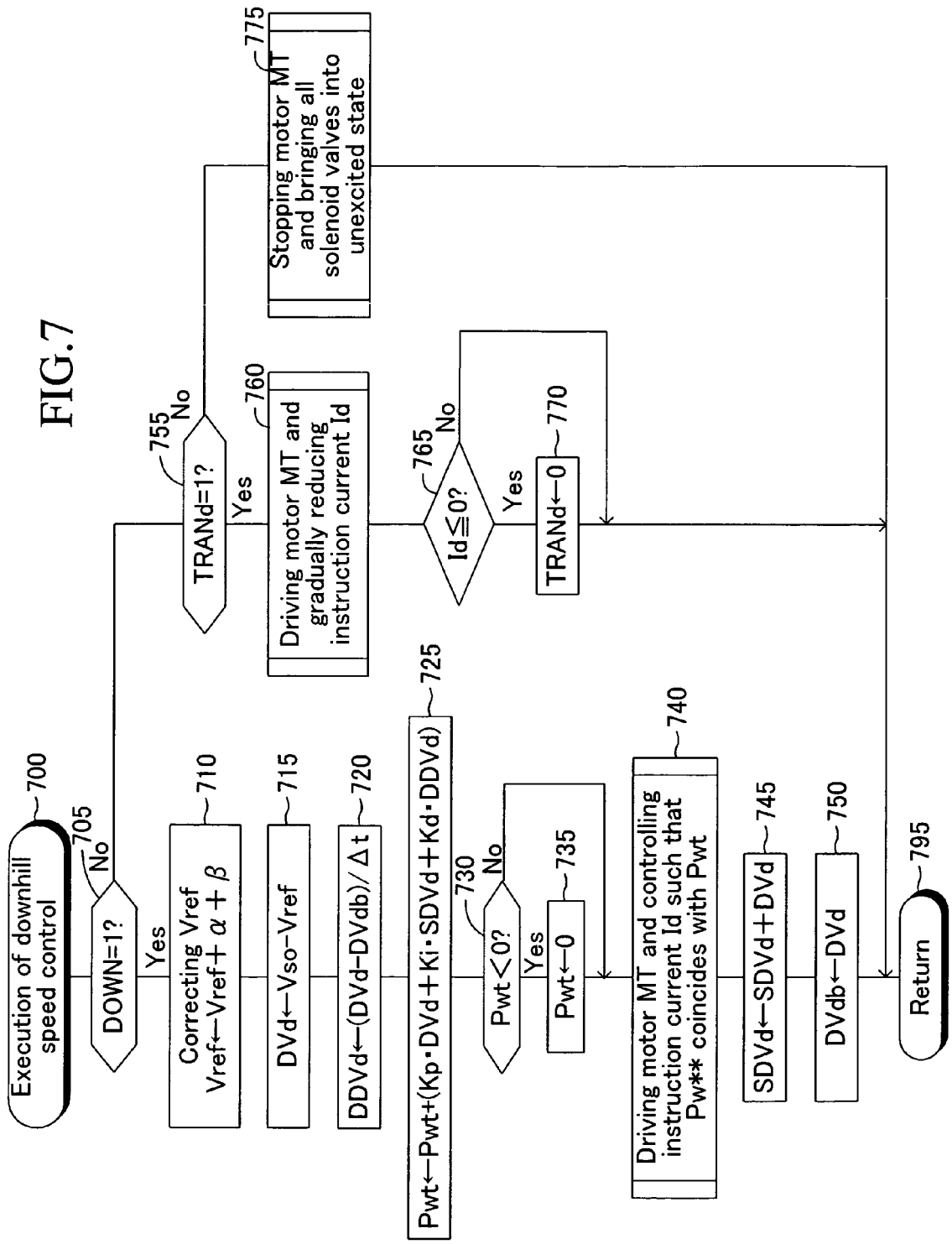
FIG. 7 is a flowchart showing a routine executed by the CPU shown in FIG. 1 for executing the downhill speed control.

On the other hand, the CPU 51 repeatedly executes a routine shown in FIG. 7 for executing the "downhill speed control" every time a predetermined time (execution interval Δt: e.g., 6 msec) elapses. Accordingly, when a predetermined timing has come, the CPU 51 initiates the processing from step 700 and proceeds to step 705 so as to determine whether the value of the flag DOWN is "1" or not.

Here, it is assumed that both the value of the flag DOWN and the value of a flag TRANd are "0" (see the period before the time t1 in FIG. 4). The CPU 51 makes a "No" determination at step 705 and further makes a "No" determination at the next step 755, and then, proceeds to step 775 so as to stop the motor MT in the brake hydraulic pressure control apparatus 30 and bring all the solenoid valves into an unexcited state. The flag TRANd indicates that the above-mentioned "downhill—flat-road transfer control" is being executed when the value thereof is "1" and that the "downhill—flat-road transfer control" is not being executed when the value thereof is "0".

After that, the CPU 51 repeatedly executes the processes at steps 705, 755 and 775 so long as the value of the flag DOWN and the value of the flag TRANd are "0". With these processes, the wheel cylinder hydraulic pressure Pw is adjusted to the value corresponding to the operating force of the brake pedal BP (see the period before the time t2 in FIG. 4**).

Subsequently explained is the case where the "downhill speed control starting condition" is established with this state (see the time t2 in FIG. 4). In this case, the CPU 51 makes a "Yes" determination when proceeding to step 610, and then, it proceeds to step 615 so as to change the value of the flag DOWN from "0" to "1" and set the value of the flag TRANd to "0".

Then, the CPU 51 proceeds to step 620 to initiate the speed deviation integrated value SDVd, speed deviation last-time value DVdb, and the target wheel cylinder hydraulic pressure Pwt to "0" for the preparation of the start of a later-described "PID control of wheel cylinder hydraulic pressure Pw". Then, the CPU 51 proceeds to step 695** so as to end the current execution of the present routine.

After that, since the value of the flag DOWN is "1", the CPU 51 makes a "No" determination, when proceeding to step 605, so as to determine whether the above-mentioned "downhill speed control ending condition" is established or not. The present point is immediately after the above-mentioned "downhill speed control starting condition" is established, so that the "downhill speed control ending condition" is not established at the present point. In addition, it is assumed that a driver keeps the accelerator pedal AP and the brake pedal BP to be turned OFF.

In this case, the CPU 51 makes a "No" determination at step 625, and proceeds to step 635 so as to determine whether at least one of the accelerator pedal AP and the brake pedal BP is turned ON or not. The CPU 51 also makes a "No" determination at this step, and then, proceeds to step 695.

After that, the CPU 51 repeatedly executes the processes at steps 605, 625 and 635 until the aforesaid "downhill speed control ending condition" is established and the driver turns ON at least either one of the accelerator pedal AP and the brake pedal BP. With these processes, the value of the flag DOWN is kept to be "1" (see the period from the time t2 to the time t5 in FIG. 4).

When the value of the flag DOWN is changed from "0" to "1" (see the time t2 in FIG. 4) by the process at the previous step 615, the CPU 51 that repeatedly executes the routine shown in FIG. 7 makes a "Yes" determination, when proceeding to step 705, and then, proceeds to step 710 so as to start and execute the process for executing the "downhill speed control".

Specifically, when the CPU 51 proceeds to step 710, it corrects the required maintenance vehicle speed Vref by adding variables α and β to the required maintenance vehicle speed Vref set and updated at the present point at the previous step 525.

The variable α is a value that changes in accordance with the turning state of the vehicle. Specifically, it assumes "0" when the turning radius of the vehicle exceeds a predetermined value, and assumes a negative constant when the turning radius of the vehicle is not more than the predetermined value. With this, the required maintenance vehicle speed can be made smaller than the current value when the turning radius of the vehicle becomes not more than the predetermined value, with the result that the vehicle stability during the downhill speed control is easy to be secured. It should be noted that the turning radius can be obtained based upon the information relating to a degree of a curve (e.g., radius or the like) of a road obtained through, for example, a vehicle roadside communication, GPS, or the like, the actual steering angle θs, or the like. The means for obtaining the turning radius as described above corresponds to turning state obtaining means, and the means for setting the variable α corresponds to required-maintenance-vehicle-speed changing means.

The variable β is a value that changes in accordance with the degree of inclination (grade) of a downhill on which the vehicle is running. Specifically, it assumes a negative constant when the inclination of the downhill on which the vehicle is running exceeds a predetermined value, and assumes "0" when the inclination is not more than the predetermined value. With this, the required maintenance vehicle speed can be made smaller than the current value when the inclination of the road on which the vehicle is running becomes excessive, with the result that the vehicle stability during the downhill speed control is easy to be secured. It should be noted that the inclination of the road on which the vehicle is running can be obtained based upon the information relating to a degree of inclination of a road obtained through, for example, a vehicle roadside communication, GPS, or the like, the difference between the vehicle body acceleration detecting value Gx obtained from the longitudinal acceleration sensor 44 and the vehicle body longitudinal acceleration obtained by time-differentiating the vehicle body speed Vso, or the like. The means for obtaining the inclination of a downhill as described above corresponds to inclination obtaining means, and the means for setting the variable β corresponds to required-maintenance-vehicle-speed changing means.

Then, the CPU 51 proceeds to step 715 so as to set the speed deviation DVd to the value obtained by subtracting the required maintenance vehicle speed Vref at the present point (actually, at the point when the "downhill speed control starting condition" is established) that is updated at the previous step 525 from the current vehicle body speed Vso updated at the previous step 510. Then, the CPU 51 obtains at the next step 720 the speed deviation differentiated value DDVd on the basis of the obtained speed deviation DVd, the speed deviation last-time value DVdb that is updated at a later-described step 750 during the previous execution of the present routine, and the equation described in the step 720.

Only when the step 720 is executed at the first time after the value of the flag DOWN is changed from "0" to "1", the value set at the previous step 620 (i.e., "0") is used as the speed deviation last-time value DVdb.

Subsequently, the CPU 51 proceeds to step 725 so as to update the target wheel cylinder hydraulic pressure Pwt on the basis of the speed deviation DVd obtained at the step 715, the sped deviation differentiated value DDVd obtained at the step 720, the speed deviation integrated value SDVd ("0" at the first time due to the process at step 620) updated in a later-described step 745, and the equation described in the step 725.

Here, the value Kp is a proportional constant, the value Ki is an integration constant, and the value Kd is a differentiation constant. Specifically, the target wheel cylinder hydraulic pressure Pwt is updated by adding the correction amount based upon the PID process relating to the speed deviation DVd to the current target wheel cylinder hydraulic pressure Pwt ("0" at the first time due to the process at step 620) at the present point.

Then, the CPU 51 proceeds to step 730 so as to determine whether the target wheel cylinder hydraulic pressure Pwt obtained at step 725 is smaller than "0" or not. When the CPU 51 makes a "No" determination, it proceeds directly to step 740. When the CPU 51 makes a "Yes" determination, it proceeds to step 735 so as to reset the target wheel cylinder hydraulic pressure Pwt to "0", and then, proceeds to step 740. This prevents the target wheel cylinder hydraulic pressure Pwt from assuming a negative value.

When the CPU 51 proceeds to step 740, it drives the motor MT (see FIG. 2) and controls the instruction current Id to the normally-open linear solenoid valves PC1 and PC2 such that the wheel cylinder hydraulic pressure Pw** coincides with the target wheel cylinder hydraulic pressure Pwt.

Then, the CPU 51 proceeds to step 745 so as to update the speed deviation integrated value SDVd by adding the speed deviation DVd obtained at the above-mentioned step 715 to the speed deviation integrated value SDVd at the present point. The CPU 51 then sets at the next step 750 the speed deviation last-time value DVdb to the speed deviation DVd, and then, proceeds to step 795 so as to end the current execution of the present routine.

After that, the CPU 51 repeatedly executes the processes at steps 705 to 710 so long as the value of the flag DOWN is "1" (until the "downhill speed control ending condition at step 625 is established and a driver turns ON at least either one of the accelerator pedal AP and the brake pedal BP) (see period from the time t2 to the time t5 in FIG. 4).

Accordingly, the wheel cylinder hydraulic pressure Pw** is feedback-controlled (specifically, PID-controlled) such that the vehicle body speed deviation DVd becomes "0" (i.e., the vehicle body speed Vso coincides with the required maintenance vehicle speed Vref), by the repeated execution of step 740. Specifically, the "downhill speed control" is continued.

Subsequently explained is the case in which the "downhill speed control ending condition at step 625 is established with this state (see the time t5 in FIG. 4) or the case in which a driver turns ON at least either one of the accelerator pedal AP and the brake pedal BP.

In this case, the CPU 51 that repeatedly executes the routine shown in FIG. 6 makes a "Yes" determination, when proceeding to step 625 or step 635, so as to change the value of the flag DOWN from "1" to "0", change the value of the flag TRANd from "0" to "1", and change the value of the flag VMR from "1" to "0".

On the other hand, when the CPU 51 proceeds to step 705 in FIG. 7, it makes a "No" determination and proceeds to step 755. With this process, the "downhill speed control" is ended. When the CPU 51 proceeds to step 755, it determines whether the value of the flag TRANd is "1" or not. The value of the flag TRANd is "1" at the present point due to the process at the previous step 630. Accordingly, the CPU 51 makes a "Yes" determination at step 755, and proceeds to step 760 so as to start the above-mentioned "downhill—flat-road transfer control".

Specifically, the CPU 51 drives the motor MT (see FIG. 2), and reduces the instruction current Id by a predetermined amount when the instruction current Id to the normally-open linear solenoid valves PC1 and PC2 at the present point is greater than "0".

Then, the CPU 51 proceeds to step 765 so as to determine whether the instruction current Id reduced at the step 760 is not more than "0" or not. When the CPU 51 makes a "No" determination (i.e., when the instruction current Id is greater than "0"), it proceeds directly to step 795. In this case, the value of the flag TRANd is kept to be "1".

After that, the CPU 51 makes a "Yes" determination, when proceeding to step 755, and repeatedly executes the processes at steps 760 and 765 until "Yes" determination is made at step 765 (i.e., so long as the instruction current Id is greater than "0"). With these processes, the instruction current Id is gradually reduced by the repeated execution of step 760, with the result that the wheel cylinder hydraulic pressure Pw** is gradually made close to the value corresponding to the operating force of the brake pedal BP. Specifically, the "downhill—flat-road transfer control" is continued.

On the other hand, when the instruction current Id becomes not more than "0" with this state, the CPU 51 makes a "Yes" determination, when proceeding to step 765, and then proceeds to step 770 so as to change the value of the flag TRANd from "1" to "0".

Since the value of the flag TRANd is "0" after that, the CPU 51 makes a "No" determination at step 765, and then proceeds to the above-mentioned step 775. Specifically, the "downhill—flat-road transfer control" is ended. After that, the wheel cylinder hydraulic pressure Pw** is adjusted to a value corresponding to the operating force of the brake pedal BP as described above. When the "downhill speed control" is ended, the "downhill—flat-road transfer control" is executed, as described above.

In case where the "downhill speed control" is ended because of the establishment of the "downhill speed control ending condition" at step 625 (see the time t5 in FIG. 4), the wheel cylinder hydraulic pressure Pw** (accordingly, the instruction current Id) has already been "0" at the point when the "downhill speed control ending condition" is established (see the time t5 in FIG. 4) as described above. Therefore, in this case, even if the "downhill—flat-road transfer control" is started, the condition at step 765 is immediately established, so that the "downhill—flat-road transfer control" is immediately ended.

Specifically, the "downhill—flat-road transfer control" effectively functions actually only when the "downhill speed control" is ended due to a driver turning ON at least either one of the accelerator pedal AP and the brake pedal BP during when the wheel cylinder hydraulic pressure Pw** is controlled to be a value greater than "0" by the "downhill speed control".

On the other hand, as described above, when the value of the flag DOWN is changed from "1" to "0" by the establishment of the "downhill speed control ending condition" at step 625 or by the operation on the accelerator pedal AP or the brake pedal BP by a driver, during the execution of the "downhill speed control", the CPU 51 that repeatedly executes the routine shown in FIG. 6 makes a "Yes" determination, when proceeding to step 605, and starts again a monitor for checking whether the above-mentioned "downhill speed control starting condition" is established or not.

When the "body-speed-maintenance requiring operation" is detected (i.e., the flag VMR becomes "1") according to the establishment of the condition at step 515 in FIG. 5, and then, the condition at step 610 in FIG. 6 is established, the "downhill speed control" is again started and executed.

As explained above, when the operation (AP: ON→OFF) for canceling the acceleration requiring operation by the accelerator pedal AP or the operation (BP: ON→OFF) for canceling the deceleration requiring operation by the brake pedal BP is done, the vehicle speed control apparatus according to the first embodiment of the present invention determines that a driver requires the maintenance of a vehicle body speed, so that it detects the "body-speed-maintenance requiring operation" and stores the vehicle body speed Vso at the point of the detection as the "required maintenance vehicle speed Vref". In addition, when the speed control apparatus determines that a vehicle is on a downhill after the detection of the "body-speed-maintenance requiring operation", it feedback-controls the brake hydraulic pressure Pw** to start and execute the automatic control (i.e., "downhill speed control") of the vehicle body speed Vso such that the vehicle body speed Vso is kept to be the above-mentioned required maintenance vehicle speed Vref.

Accordingly, in case where a driver requires the start of the automatic control for the vehicle body speed (i.e., in case where a driver performs the "body-speed-maintenance requiring operation"), the driver is not required to operate the components (e.g., automatic running switch, or the like) other than the "operation member for changing the vehicle speed" such as the accelerator pedal AP, brake pedal BP, or the like. As a result, the operation by a driver necessary for the start of the automatic control for the vehicle body speed can be made simple.

Further, when the accelerator pedal AP or the brake pedal BP is operated by a driver during the execution of the "downhill speed control", the "downhill speed control" is immediately ended. Accordingly, the driver can readjust the vehicle body speed Vso to a new desired speed by continuously operating the accelerator pedal AP or the brake pedal BP, that is currently operated, after that. The driver again executes the "body-speed-maintenance requiring operation" by the accelerator pedal AP or the brake pedal BP, that is currently operated, at the point when the adjustment of the vehicle body speed Vso is completed, whereby he/she can start again the "downhill speed control" for keeping the vehicle body speed Vso to be the new desired speed. In other words, the driver can freely set and change the vehicle body speed Vso (i.e., required maintenance vehicle speed Vref) kept during the downhill speed control only by operating the accelerator pedal AP or the brake pedal BP.

The present invention is not limited to the aforesaid first embodiment, and various modifications may be employed within the scope of the invention. For example, in the aforesaid first embodiment, the condition for determining that "the vehicle is on a downhill" (i.e., the "downhill speed control starting condition") is established by utilizing the phenomenon in which the vehicle body speed increases due to the accelerating action by gravity. However, the apparatus may be configured such that the inclination of a road on which a vehicle is running is obtained on the basis of the information relating to the degree of inclination of a road obtained through the vehicle roadside communication, GPS, or the like, or the difference between the vehicle body speed acceleration detecting value Gx obtained from the longitudinal acceleration sensor 44 and the value of the vehicle body speed longitudinal acceleration obtained by time-differentiating the vehicle body speed Vso, and the condition for determining that "a vehicle is on a downhill" (i.e., "downhill speed control starting condition") is established when the obtained road (downward) inclination is not less than a predetermined value.

Similarly, in the first embodiment, the condition for determining that "a vehicle moves to a flat road" (i.e., the "downhill speed control ending condition") is established by utilizing the phenomenon in which the vehicle body speed is reduced by the end of the accelerating action by gravity. However, the apparatus may be configured such that the condition for determining that "a vehicle moves to a flat road" (i.e., the "downhill speed control ending condition") is established when the road inclination obtained based upon the information relating to the degree of inclination of the road obtained through the vehicle roadside communication, GPS, or the like, the difference between the vehicle body speed acceleration detecting value Gx and the vehicle longitudinal acceleration obtained by time-differentiating the vehicle body speed Vso, or the like, is less than a predetermined value.

Second Embodiment

Subsequently, a vehicle speed control apparatus according to the second embodiment of the present invention will be explained. The second embodiment is different from the first embodiment in that an uphill speed control by a throttle valve opening control is executed instead of the downhill speed control by the brake hydraulic pressure control. Therefore, the different points will mainly be explained hereinafter.

Outline of Uphill Speed Control

The outline of the uphill speed control executed by the speed control apparatus 10 (hereinafter referred to as "present apparatus") according to the second embodiment will be explained. In case where a vehicle is on an uphill and a driver intends to keep a vehicle body speed at a desired speed, it is necessary to continuously operate the accelerator pedal AP. In other words, in case where a vehicle is on an uphill, a degree of a demand for an automatic control for keeping the vehicle body speed constant is extremely high, like the case where the vehicle is on a downhill.

Accordingly, the present apparatus detects the "body-speed-maintenance requiring operation" under the condition same as that in the foregoing first embodiment, and stores the vehicle body speed Vso at the point of the detection of the "body-speed-maintenance requiring operation" as the "required maintenance vehicle speed Vref".

In addition, the present apparatus determines whether the vehicle is on an uphill or not after the detection of the "body-speed-maintenance requiring operation". When it determines that the vehicle is on an uphill, it feedback-controls the throttle valve opening TA such that the vehicle body speed is kept to be the required maintenance vehicle speed Vref, thereby automatically controlling the vehicle body speed. The specific control method of the throttle valve opening TA will be described later.

Here, "whether the vehicle is on an uphill or not" can be determined by utilizing the decelerating action by gravity exerted on the vehicle on an uphill, for example. Specifically, the vehicle on an uphill can gradually be decelerated due to the decelerating action by gravity after the detection of the "body-speed-maintenance requiring operation" (i.e., in a state in which both the accelerator pedal AP and the brake pedal BP are turned OFF).

Accordingly, it can be determined that "a vehicle is on an uphill" when a condition in which "both the accelerator pedal AP and the brake pedal BP are turned OFF" and "the value obtained by subtracting the vehicle body speed Vso from the required maintenance vehicle speed Vref is greater than a predetermined value C (positive constant value)" after the detection of the "body-speed-maintenance requiring operation" (hereinafter referred to as "uphill speed control starting condition") is established.

From the above, when the "uphill speed control starting condition" is established after the detection of the "body-speed-maintenance requiring operation", the present apparatus controls the throttle valve opening TA regardless of the operation on the accelerator pedal by a driver, thereby performing an automatic control for keeping the vehicle body speed Vso to be the required maintenance vehicle speed Vref. This automatic control is referred to as the "uphill speed control".

Figure 8:
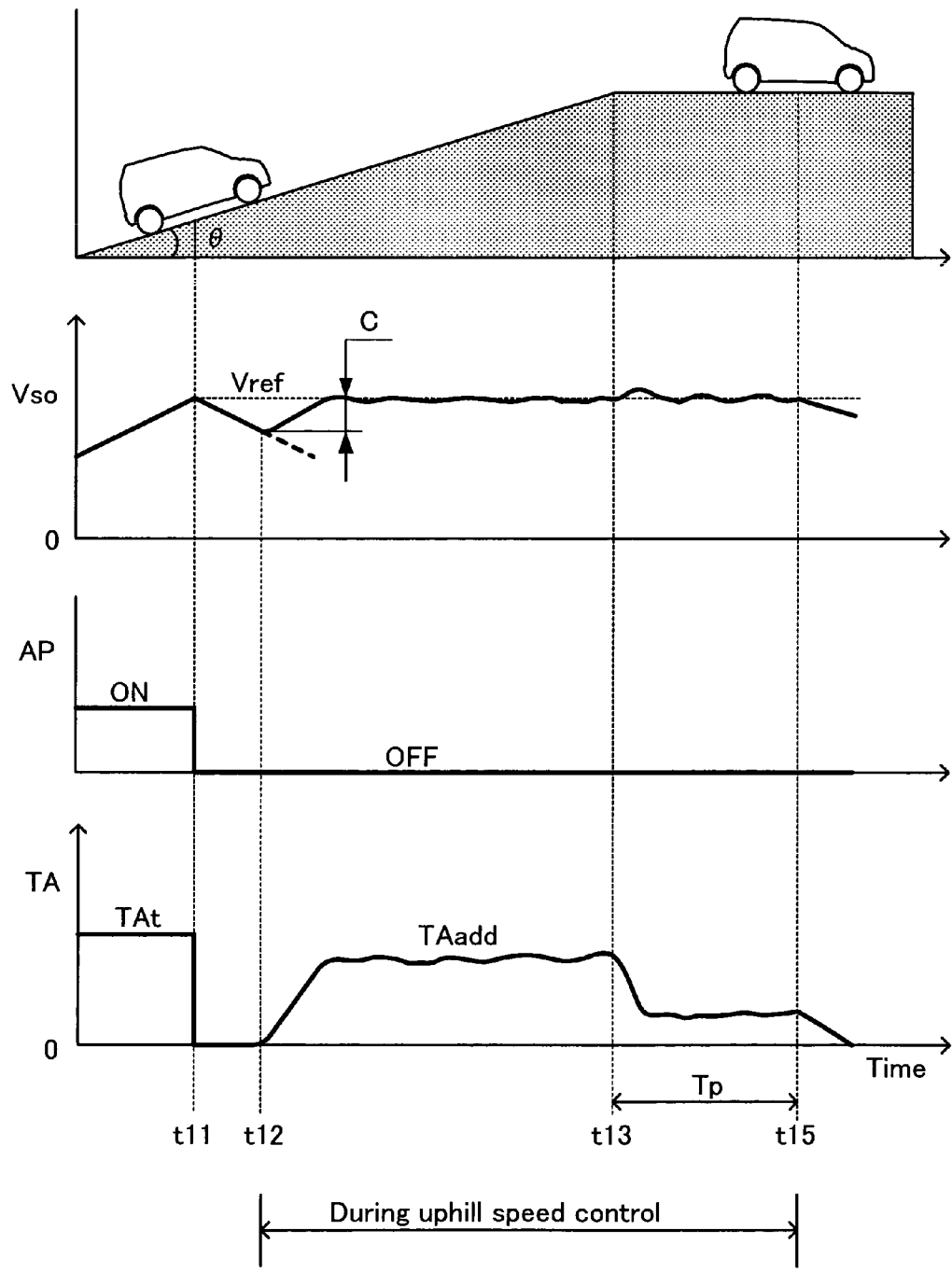
FIG. 8 is a time chart showing one example of a change in a vehicle body speed, a state of an accelerator pedal, and a throttle valve opening in case where an uphill speed control is executed to a vehicle running on an uphill.

FIG. 8 is a time chart showing one example of the change in the vehicle body speed Vso, the state of the accelerator pedal AP and the throttle valve opening TA, when the uphill speed control is executed by the present apparatus to a vehicle running on an uphill. In FIG. 8, it is supposed that the brake pedal is kept to be OFF. Further, in FIG. 8, times t11, t12, t13, and t15 correspond respectively to the times t1, t2, t3 and t5 in FIG. 4. It is assumed that the uphill speed control is not executed before the time t11.

As shown in FIG. 8, a driver operates the accelerator pedal AP (ON) to adjust the vehicle body speed Vso to a desired speed before the time t11. As a result, the throttle valve opening TA is adjusted so as to coincide with the target throttle valve opening TAt corresponding to the operating amount Accp of the accelerator pedal, whereby the driving force according to the operating amount Accp of the accelerator pedal is given to the vehicle.

When the time t11 has arrived, the adjustment of the vehicle body speed Vso to the desired speed is completed, so that the driver releases the operating accelerator pedal AP (i.e., the state of the accelerator pedal AP is changed from ON-state to OFF-state). With this operation, the present apparatus detects the "body-speed-maintenance requiring operation" at the time t11 and sets the required maintenance vehicle speed Vref to the vehicle body speed Vso at this point.

After the time t11, the accelerator pedal AP (and the brake pedal BP) is in OFF-state (accordingly, the throttle valve opening TA becomes "0"), so that the vehicle body speed Vso gradually decreases due to the decelerating action by gravity. Accordingly, the value obtained by subtracting the vehicle body speed Vso from the required maintenance vehicle speed Vref exceeds the predetermined value C when the time t12 has arrived.

As a result, the aforesaid "uphill speed control starting condition" is established at the time t12, so that the present apparatus starts the "uphill speed control" at the time t12. Specifically, the present apparatus controls the throttle valve actuator 22 after the time t12 until the later-described "uphill speed control ending condition" is established, regardless of the accelerator pedal AP being kept to be OFF-state, thereby feedback-controlling the throttle valve opening TA such that the vehicle body speed Vso is kept to be the required maintenance vehicle speed Vref.

More specifically, in order to keep the vehicle body speed Vso to be the required maintenance vehicle speed Vref, the value of the throttle valve opening (hereinafter referred to as "opening addition value TAadd") that should be added to the target throttle valve opening TAt corresponding to the operating amount Accp of the accelerator pedal AP is calculated and updated, whereby the throttle valve actuator 22 is controlled such that the throttle valve opening TA assumes (TAt+TAadd). Since the accelerator pedal operation amount Accp is kept to be "0" during the execution of the "uphill speed control", the target throttle valve opening TAt is kept to be "0". Accordingly, the throttle valve opening TA is actually controlled to be the value equal to the opening addition value TAadd.

As a result, the vehicle body speed Vso that becomes smaller than the required maintenance vehicle speed Vref is immediately increased near the required maintenance vehicle speed Vref after the time t12, and after that, is kept to be near the required maintenance vehicle speed Vref. On the other hand, in case where the "uphill speed control" is not executed after the time t12, the vehicle body speed Vso keeps gradually decreasing even after the time t12 as shown by a broken line in FIG. 8.

When the time t13 has arrived, it is assumed that the vehicle moves to a flat road (horizontal road) from an uphill. Therefore, it is necessary to end the uphill speed control. Accordingly, it is necessary to determine whether "the vehicle moves to a flat road or not". Here, the determination whether "the vehicle moves to a flat road" is done when the degree of inclination of a road (upward inclination θ) is obtained based upon the difference between the vehicle body speed acceleration detecting value Gx obtained from the longitudinal acceleration sensor 44 and the longitudinal acceleration obtained by time-differentiating the vehicle body speed Vso, and the condition in which the state where the obtained inclination θ is less than a micro-value θmin continues for a predetermined short period Tp (hereinafter referred to as "uphill speed control ending condition") is established (see time t15).

From the above, the present apparatus determines that the "uphill speed control ending condition" is established at the time t15 when the "uphill speed control ending condition" is established, so that it ends the "uphill speed control" at the time t15. With this, the throttle valve opening TA is adjusted to the target throttle valve opening TAt that is the value corresponding to the accelerator pedal operating amount Accp after the time t15 (precisely, after the end of a later-described "uphill—flat-road transfer control" and until the aforesaid "uphill speed control starting condition" is again established), like the period before the time t11.

During the period from the time t13 to the time 15, the throttle valve opening TA (=TAadd) is adjusted to a value for obtaining driving force necessary for keeping the vehicle body speed Vso to be the required maintenance vehicle speed Vref against the resistance (so-called running resistance) based upon air resistance involved with the run on the flat road. In other words, different from the wheel cylinder hydraulic pressure Pw (="0") at the point of the end of the "downhill speed control" (time t5) shown in FIG. 4, the throttle valve opening TA becomes greater than "0" at the point of the end of the "uphill speed control" (time t15).

In addition, in case where the accelerator pedal AP or the brake pedal BP is operated (turned ON) by a driver during the execution of the "uphill speed control" (during the period from the time t12 to the time t15 in FIG. 8), the present apparatus immediately ends the "uphill speed control". Accordingly, the driver can freely set/change the vehicle body speed (i.e., required maintenance vehicle speed Vref) that is kept during the uphill speed control to a desired value only by operating the accelerator pedal AP or the brake pedal BP, like the first embodiment.

When the throttle valve opening TA (=TAadd >0) generated at the ending point of the "uphill speed control" is immediately changed to the target throttle valve opening TAt after that in case where the "uphill speed control" is ended by the operation of the accelerator pedal AP and the brake pedal BP or by the establishment of the "uphill speed control ending condition" as described above, shock accompanied by the rapid decrease in the driving force is likely to be produced on the vehicle, which may bring uncomfortable feeling to a driver.

Accordingly, in this case, the present apparatus executes a later-described "uphill—flat-road transfer control" after the end of the "uphill speed control" (after the time t15 in FIG. 8). Specifically, the present apparatus gradually reduces the opening addition value TAadd (>0) toward "0" after the end of the "uphill speed control", and controls the throttle valve opening TA so as to assume (TAt+TAadd) until the opening addition value TAadd reaches "0". The above is the outline of the "uphill speed control".

Actual Operation of Second Embodiment

The actual operation of the speed control apparatus according to the second embodiment will be explained hereinafter. The CPU 51 of this apparatus executes the routine shown in FIG. 5, among the routines shown in FIGS. 5 to 7 executed by the CPU 51 in the first embodiment, and repeatedly executes routines shown in FIGS. 9 and 10, that respectively correspond to FIGS. 6 and 7, in the form of flowcharts, instead of the routines shown in FIGS. 6 and 7, every time a predetermined time elapses.

The CPU 51 in this apparatus also executes steps 530 and 535 indicated by a broken line in the routine shown in FIG. 5. Here, Dvso is a time-differentiated value of the vehicle body speed Vso, and Vsob is the vehicle body speed last-time value. The reason why the time-differentiated value Dvso of the vehicle body speed is calculated in the second embodiment as described above is that it is required to obtain the degree of inclination (upward inclination θ) of a road in the determination at step 925 (above-mentioned "uphill speed control ending condition") in the later-described routine shown in FIG. 9.

Figure 9:
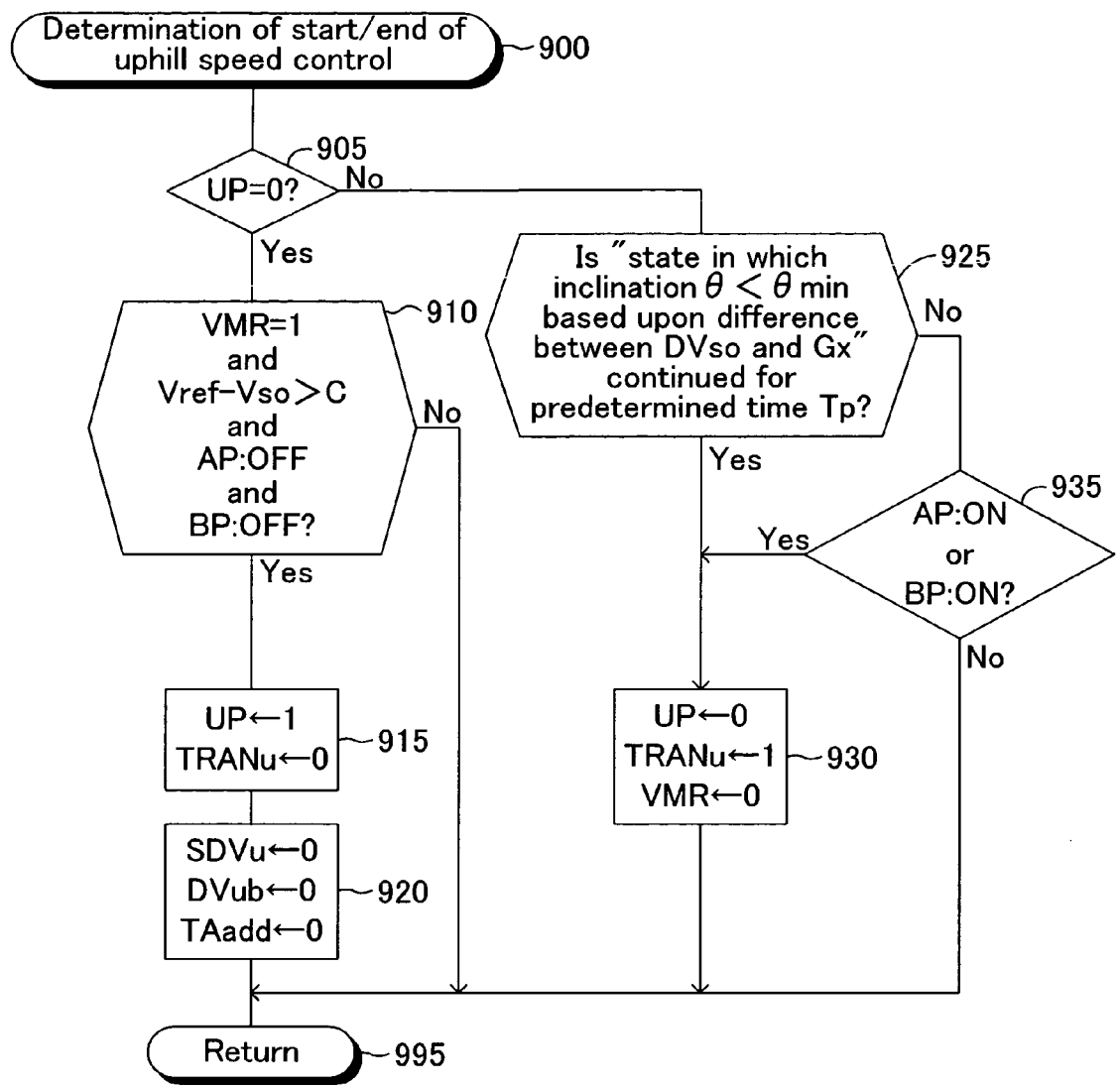
FIG. 9 is a flowchart showing a routine executed by the CPU in a speed control apparatus according to a second embodiment for determining the start/end of the uphill speed control.

The steps 905 to 935 in the routine shown in FIG. 9 for executing the "determination of the start or end of the uphill speed control" respectively correspond to the steps 605 to 635 in the routine shown in FIG. 6. Therefore, the detailed explanation of the routine shown in FIG. 9 is omitted.

In FIG. 9, a flag UP indicates that the "uphill speed control" is being executed when the value thereof is "1" and that the "uphill speed control" is not being executed when the value thereof is "0". A flag TRANu indicates that the "uphill—flat-road transfer control" is being executed when the value thereof is "1" and that that the "uphill—flat-road transfer control" is not being executed when the value thereof is "0". The step 910 is a step for determining whether the "uphill speed control starting condition" is established or not, and the step 925 is a step for determining whether the "uphill speed control ending condition" is established or not. The step 910 corresponds to uphill determining means.

The steps 1005 to 1070 in the routine shown in FIG. 10 for executing the "uphill speed control" respectively correspond to the steps 705 to 770 in the routine shown in FIG. 7. Therefore, the detailed explanation of the routine shown in FIG. 10 is also omitted.

In FIG. 10, the opening addition value TAadd is updated during the execution of the "uphill speed control" (UP=1) on the basis of the speed deviation Dvu obtained at step 1015, the speed deviation differentiated value DDVu obtained at step 1020, the speed deviation integrated value SDVu ("0" at the first time due to the process at step 920) updated at step 1045, and the equation described in step 1025.

Specifically, the opening addition value TAadd is updated by adding the correction amount based upon the PID process relating to the speed deviation DVu to the opening addition value TAadd at the present point ("0" at the first time due to the process at step 920).

By the repeated execution of the step 1040, the throttle valve opening TA (=TAadd) is feedback-controlled (specifically PID-controlled) such that the vehicle body speed deviation Dvu becomes "0" (i.e., the vehicle body speed Vso coincides with the required maintenance vehicle speed Vref). Specifically, the "uphill speed control" is executed.

During the execution of the "uphill—flat-road transfer control" (UP=0, TRANu=1) after the end of the "uphill speed control", the opening addition value TAadd (>0) is gradually reduced to "0" at step 1060, and the throttle valve opening TA is controlled to be (TAt+TAadd) at step 1080, until the opening addition value TAadd reaches "0", by using the target throttle valve opening TAt obtained from the accelerator pedal operating amount Accp at step 1075.

After the end of the "uphill—flat-road transfer control" (UP=TRANu=u0), the throttle valve opening TA is controlled to be TAt at step 1090 by using the target throttle valve opening TAt obtained from the accelerator pedal operating amount Accp at step 1085.

The vehicle speed control apparatus according to the second embodiment of the present invention can also facilitate the operation by a driver necessary for the start of the automatic control of the vehicle body speed, like the first embodiment. Further, when the accelerator pedal AP or the brake pedal BP is operated by a driver during the execution of the "uphill speed control", the "uphill speed control" is immediately ended. Accordingly, the driver can freely set/change the vehicle body speed (i.e., required maintenance vehicle speed Vref) that is kept during the uphill speed control to a desired value only by operating the accelerator pedal AP or the brake pedal BP.

The present invention is not limited to the aforesaid second embodiment, and various modifications may be employed within the scope of the invention. For example, in the aforesaid second embodiment, the condition for determining that "the vehicle is on an uphill" (i.e., the "uphill speed control starting condition") is established by utilizing the phenomenon in which the vehicle body speed decreases due to the decelerating action by gravity. However, the apparatus may be configured such that the inclination of a road on which a vehicle is running is obtained on the basis of the information relating to the degree of inclination of a road obtained through the vehicle roadside communication, GPS, or the like, or the difference between the vehicle body speed acceleration detecting value Gx obtained from the longitudinal acceleration sensor 44 and the value of the vehicle body speed longitudinal acceleration obtained by time-differentiating the vehicle body speed Vso, and the condition for determining that "a vehicle is on an uphill" (i.e., "uphill speed control starting condition") is established when the obtained road (upward) inclination is not less than a predetermined value.

In the aforesaid first and second embodiments, the apparatus may be configured such that the aforesaid "downhill speed control starting condition" or the "uphill speed control starting condition" can be established only when a road on which a vehicle is running is in a state of a predetermined low-μ road or in a state of a predetermined rough road. In this case, whether "the road on which a vehicle is running is in a state of a predetermined low-μ road or in a state of a predetermined rough road" can be determined, for example, on the basis of a road state obtained by a vehicle roadside communication, output from an ambient temperature sensor, or the like.

In addition, the speed control apparatus according to the present invention may be configured to execute both the "downhill speed control" in the first embodiment and the "uphill speed control" in the second embodiment.

What is claimed is:
1. A vehicle speed control apparatus comprising:
vehicle-speed-maintenance requiring operation detecting means that detects a body-speed-maintenance requiring operation by a driver based upon the operation by the driver on an operation member for changing the vehicle speed that is operated for changing the vehicle body speed;
storing means that stores, as a required maintenance vehicle speed, the vehicle body speed at the point when the body-speed-maintenance requiring operation is detected by the vehicle-speed-maintenance requiring operation detecting means; and vehicle speed automatic control means that automatically controls the vehicle body speed so as to be maintained at the required maintenance vehicle speed, in a case where the body-speed-maintenance requiring operation is detected by the vehicle-speed-maintenance requiring operation detecting means.

2. A vehicle speed control apparatus according to claim 1, wherein the vehicle-speed-maintenance requiring operation detecting means is configured to detect the body-speed-maintenance requiring operation by the driver by the cancel of an acceleration requiring operation by the driver to an accelerating operation member that is operated for accelerating the vehicle and that serves as the operation member for changing the vehicle speed.

3. A vehicle speed control apparatus according to claim 1, wherein the vehicle-speed-maintenance requiring operation detecting means is configured to detect the body-speed-maintenance requiring operation by the driver by the cancel of a deceleration requiring operation by the driver to a decelerating operation member that is operated for decelerating the vehicle and that serves as the operation member for changing the vehicle speed.

4. A vehicle speed control apparatus according to claim 1, further comprising:

downhill determining means for determining whether the vehicle is on a downhill or not, wherein the vehicle speed automatic control means automatically controls the vehicle body speed in a case where the body-speed-maintenance requiring operation is detected by the vehicle-speed-maintenance requiring operation detecting means and the downhill determining means determines that the vehicle is on a downhill.

5. A vehicle speed control apparatus according to claim 4, wherein the downhill determining means is configured to detect that the vehicle is on a downhill when the driver does not operate the operation member for changing the vehicle speed and when a value obtained by subtracting the required maintenance vehicle speed from the vehicle body speed is greater than a predetermined value.

6. A vehicle speed control apparatus according to claim 1, further comprising:

uphill determining means for determining whether the vehicle is on an uphill or not, wherein the vehicle speed automatic control means automatically controls the vehicle body speed in a case where the body-speed-maintenance requiring operation is detected by the vehicle-speed-maintenance requiring operation detecting means and the uphill determining means determines that the vehicle is on an uphill.

7. A vehicle speed control apparatus according to claim 6, wherein the uphill determining means is configured to detect that the vehicle is on an uphill when the driver does not operate the operation member for changing the vehicle speed and when a value obtained by subtracting the vehicle body speed from the required maintenance vehicle speed is greater than a predetermined value.

8. A vehicle speed control apparatus according to claim 1, further comprising:

turning state obtaining means for obtaining a turning state of the vehicle; and required-maintenance-vehicle-speed changing means for changing the required maintenance vehicle speed in accordance with the obtained turning state of the vehicle.

9. A vehicle speed control apparatus according to claim 1, further comprising:

inclination degree obtaining means for obtaining a degree of inclination of a road surface on which the vehicle is running; and required-maintenance-vehicle-speed changing means for changing the required maintenance vehicle speed in accordance with the obtained degree of inclination of the road surface.

10. A vehicle speed control apparatus according to claim 1, further comprising:

road state determining means for determining whether the road surface on which the vehicle is running is in a specific state or not, wherein the vehicle speed automatic control means automatically controls the vehicle body speed when the body-speed-maintenance requiring operation is detected by the vehicle-speed-maintenance requiring operation detecting means and the road state determining means determines that the road surface on which the vehicle is running is in the specific state.

11. A vehicle speed control apparatus according to claim 10, wherein the road state determining means is configured to adopt a state of predetermined low-$\mu$ road as the specific state.

12. A vehicle speed control apparatus according to claim 10, wherein the road state determining means is configured to adopt a state of predetermined rough road as the specific state.

13. A vehicle speed control apparatus according to claim 1, wherein the vehicle speed automatic control means is configured to end the automatic control of the vehicle body speed when an operation by the driver on the operation member for changing the vehicle speed is detected during the execution of the automatic control of the vehicle body speed.

14. A vehicle speed control program embodied on a computer-readable medium and comprising:

a vehicle-speed-maintenance requiring operation detecting step that detects a body-speed-maintenance requiring operation by a driver based upon the operation by the driver on an operation member for changing the vehicle speed that is operated for changing the vehicle body speed;

a storing step that stores, as a required maintenance vehicle speed, the vehicle body speed at the point when the body-speed-maintenance requiring operation is detected by the vehicle-speed-maintenance requiring operation detecting step; and a vehicle speed automatic control step that automatically controls the vehicle body speed so as to be maintained at the required maintenance vehicle speed, in a case where the body-speed-maintenance requiring operation is detected by the vehicle-speed-maintenance requiring operation detecting step.

* * * * *